US008553250B2

(12) United States Patent
Kato

(10) Patent No.: US 8,553,250 B2
(45) Date of Patent: Oct. 8, 2013

(54) PRINTING DEVICE, SYSTEM AND METHOD FOR IMAGE FORMING

(75) Inventor: Tokunori Kato, Ichinomiya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 1078 days.

(21) Appl. No.: 11/492,859

(22) Filed: Jul. 26, 2006

(65) Prior Publication Data

US 2007/0024902 A1 Feb. 1, 2007

(30) Foreign Application Priority Data

Jul. 26, 2005 (JP) ................................. 2005-215612

(51) Int. Cl.
*G06F 3/12* (2006.01)
*H04N 1/60* (2006.01)
(52) U.S. Cl.
USPC ....... 358/1.15; 358/1.17; 358/1.18; 358/1.13; 358/1.9; 358/402; 348/231.2; 348/231.3; 348/231.99; 715/100
(58) Field of Classification Search
USPC ............ 348/231.3, 207.2; 365/229; 358/1.15, 358/1.18, 1.13, 1.9
See application file for complete search history.

(56) References Cited

U.S. PATENT DOCUMENTS

| 5,084,831 | A | * | 1/1992 | Morikawa et al. ........... 358/1.17 |
| 6,115,132 | A | * | 9/2000 | Nakatsuma et al. ......... 358/1.14 |
| 6,273,535 | B1 | | 8/2001 | Inoue et al. |
| 6,348,974 | B1 | * | 2/2002 | Takahashi et al. ........... 358/1.16 |
| 6,388,765 | B1 | * | 5/2002 | Nagano et al. ............... 358/1.18 |
| 6,583,886 | B1 | * | 6/2003 | Ochiai ......................... 358/1.15 |
| 6,801,962 | B2 | * | 10/2004 | Taniguchi et al. ............... 710/33 |
| 6,980,315 | B2 | * | 12/2005 | Komatsu et al. ............. 358/1.16 |
| 7,046,392 | B2 | * | 5/2006 | Shibata et al. ................ 358/1.9 |
| 7,180,612 | B2 | * | 2/2007 | Shimizu ....................... 358/1.13 |
| 7,239,412 | B2 | * | 7/2007 | Leslie ......................... 358/1.15 |
| 7,440,134 | B2 | * | 10/2008 | Natori ............................ 358/1.9 |
| 7,515,184 | B2 | * | 4/2009 | Fujii et al. ..................... 348/282 |
| 7,564,487 | B2 | * | 7/2009 | Kato et al. ................. 348/231.2 |
| 2001/0050875 | A1 | * | 12/2001 | Kahn et al. .................... 365/229 |
| 2002/0015180 | A1 | * | 2/2002 | Tominaga .................... 358/1.15 |
| 2002/0067515 | A1 | * | 6/2002 | Abe .............................. 358/442 |
| 2002/0101603 | A1 | * | 8/2002 | Christodoulou et al. .... 358/1.14 |
| 2002/0159092 | A1 | * | 10/2002 | Christodoulou et al. .... 358/1.15 |
| 2003/0002898 | A1 | * | 1/2003 | Kimura ........................... 400/76 |
| 2003/0007174 | A1 | * | 1/2003 | Takagi et al. ................ 358/1.15 |
| 2003/0016378 | A1 | * | 1/2003 | Ozawa et al. ................ 358/1.13 |
| 2003/0086112 | A1 | * | 5/2003 | Hashimoto et al. .......... 358/1.14 |
| 2003/0103221 | A1 | * | 6/2003 | Natori ............................ 358/1.9 |
| 2003/0202208 | A1 | * | 10/2003 | Mellor et al. ................ 358/1.16 |

(Continued)

FOREIGN PATENT DOCUMENTS

| JP | HEI 9-30085 | 2/1997 |
| JP | HEI 10-226139 | 8/1998 |

(Continued)

*Primary Examiner* — Akwasi M Sarpong
(74) *Attorney, Agent, or Firm* — Scully, Scott, Murphy & Presser, PC

(57) ABSTRACT

There is provided a recording device provided with a communication unit configured to receive image data and a print execution instruction from an external device, a display unit, a printing unit, a storage unit; and a controller that stores the image data in the storage unit and displays an image corresponding to the image data on the display unit in response to receipt of the print execution instruction.

17 Claims, 11 Drawing Sheets

(56) References Cited

U.S. PATENT DOCUMENTS

| | | | |
|---|---|---|---|
| 2004/0008374 A1* | 1/2004 | Choi | 358/1.16 |
| 2004/0136030 A1* | 7/2004 | Gassho | 358/1.15 |
| 2004/0136032 A1* | 7/2004 | Kizaki et al. | 358/1.16 |
| 2004/0253990 A1* | 12/2004 | McCoog et al. | 455/557 |
| 2005/0111049 A1* | 5/2005 | Mori | 358/402 |
| 2005/0122539 A1* | 6/2005 | Sugimoto | 358/1.15 |
| 2005/0206953 A1* | 9/2005 | Kujirai et al. | 358/1.15 |
| 2010/0134814 A1* | 6/2010 | Oshima | 358/1.9 |

FOREIGN PATENT DOCUMENTS

| | | |
|---|---|---|
| JP | 2000-261590 | 9/2000 |
| JP | 2001-268484 | 9/2001 |
| JP | 2004-207926 | 7/2004 |
| JP | 2005-161768 | 6/2005 |

* cited by examiner

PRINTING DEVICE, SYSTEM AND METHOD FOR IMAGE FORMING

CROSS-REFERENCE TO RELATED APPLICATION

This application claims priority under 35 U.S.C. §119 from Japanese Patent Application No. 2005-215612, filed on Jul. 26, 2005. The entire subject matter of the application is incorporated herein by reference.

TECHNICAL FIELD

Aspects of the present invention relate to a recording device configured to record an image on a recording medium using image data and print setting information transmitted from an external device.

RELATED ART

A technique for directly connecting an imaging device, such as a digital camera or a digital video camera, to a printing device to cause the printing device to form images on recording sheets using image data directly transmitted from the imaging device has been known. Such a technique is frequently called "direct printing." For the direct printing, a standard communication interface, such as a USB (Universal Serial Bus), is adapted to directly connect the imaging device to the printing device.

In direct printing, a user operates the imaging device to select an image to be printed from among images displayed on an LCD panel of the imaging device (i.e., from among images stored in the imaging device), to make settings for printing (e.g., the type of sheets and the number of copies), and to input a print start command to the printing device. The image data and print setting information are transmitted from the imaging device to the printing device. The printing device outputs an image on a recording sheet in accordance with the image data and the print setting information from the imaging device.

In general, imaging devices, such as a digital camera, are designed to be compact. Therefore, a size of an LCD of the imaging device is limited to a relatively small size. In Japanese Patent Provisional Publication No. 2004-207926 (hereafter, referred to as JP 2004-207926A), a system designed to solve the above-mentioned difficulty in checking an image to be printed and print setting information is disclosed. In the system of JP 2004-207926A, an LCD of a digital camera and an LCD of a recording device are used concurrently.

SUMMARY

Aspects of the present invention are advantageous in that a recording device, an image forming system and an image forming method capable of enhancing usability in direct printing are provided.

BRIEF DESCRIPTION OF THE ACCOMPANYING DRAWINGS

DETAILED DESCRIPTION

General Overview

Figure 1:
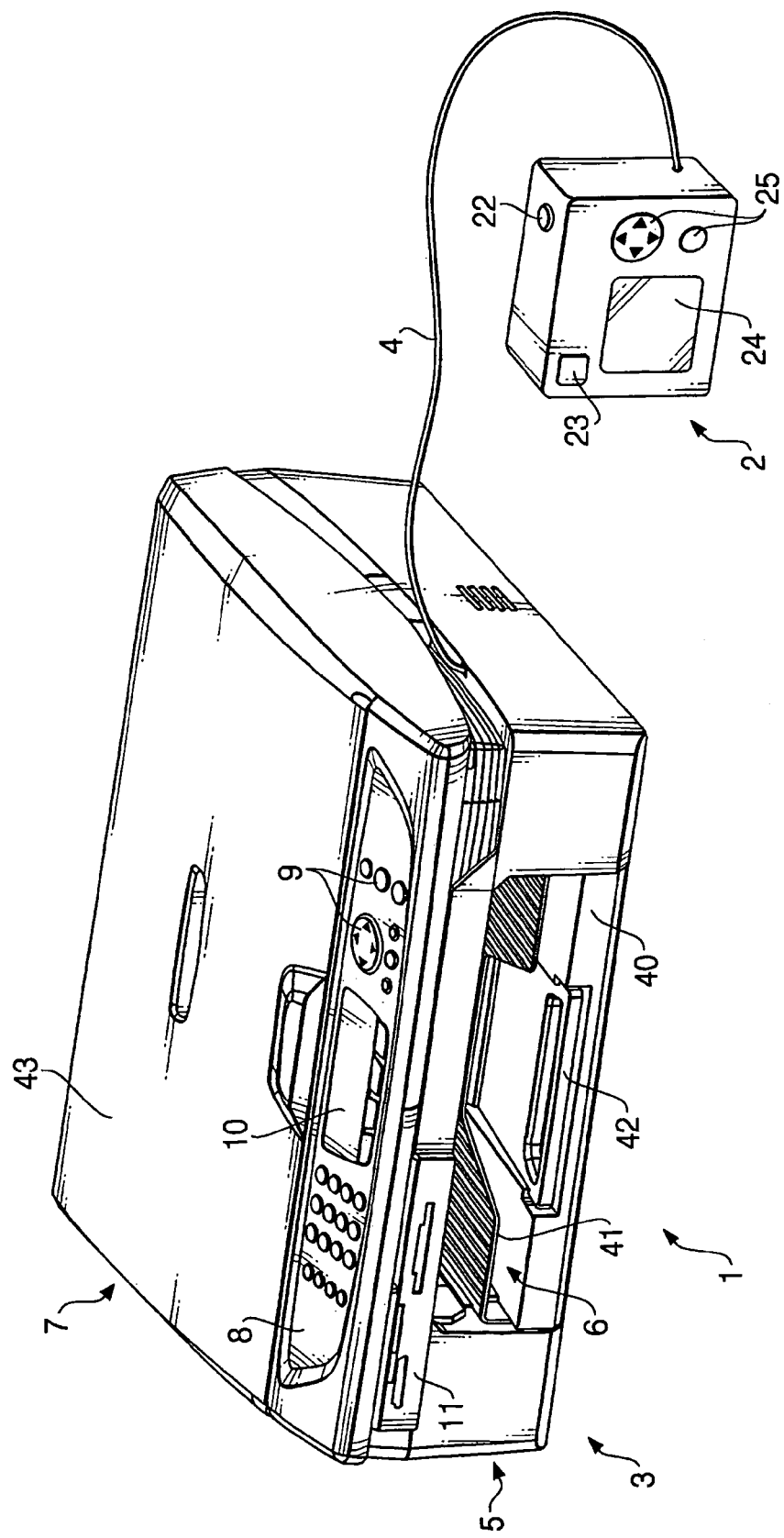
FIG. 1 is a perspective view of an image forming system according to an embodiment of the invention.

It is noted that various connections are set forth between elements in the following description. It is noted that these connections, in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to an aspect of the invention, there is provided a recording device, which is provided with a communication unit configured to receive image data and a print execution instruction from an external device, a display unit, a printing unit, a storage unit; and a controller that stores the image data in the storage unit and displays an image corresponding to the image data on the display unit in response to receipt of the print execution instruction.

With this configuration, it is possible to set the controller for the print and display mode. By setting the controller for the print and display mode, an image corresponding to image data transmitted from the external device is formed on a recording medium. By finishing the recording of the image, data transmission from the external device is also finished. By storing the image data and the print setting information in the storage unit, the controller causes the recording unit to record the image in accordance with the image data and the print setting information stored in the storage unit. Because the image corresponding to the image data stored in the storage unit is displayed, a user is able to check the image through the display unit.

According to another aspect of the invention, there is provided a recording device, which is provided with a communication unit configured to receive image data and a print execution instruction from an external device, a display unit, a printing unit, a storage unit; and a controller that stores the image data in the storage unit and displays an image corresponding to the image data on the display unit, and transmits print end information to the external device.

With this configuration, it is possible to set the controller for the single display mode. By setting the controller to the single display mode, image data and print setting information are stored in the storage unit without causing the recording unit to record the image. Since the image corresponding to the image data stored in the storage unit is displayed, a user is able to check the image on the display unit. After data transmission from the external device is finished, the controller transmits the print end information to the external device. By receiving the print end information, the external device terminates the data communication based on the predetermined communication protocol. Thereafter, the user is able to cause the recording device to form the image corresponding to the image data stored in the storage unit or to perform image processing on the image. Such a configuration enables the recording device to communicate with the external device using a standard communication protocol and thereby support a wide range of external devices employing a standard communication protocol.

In the above-mentioned two aspects of the recording device, the controller may further support execution of a single print mode in which the controller causes the printing unit to print an image on the recording medium in accordance with the image data stored in the storage unit.

By setting the controller for the single print mode, it is possible to cause the recording unit to record the image without storing the image data and the print setting information if there is no necessity to display the image on the display unit of the recording device.

The printing device may further comprise an input unit. In the print and display mode or in the single display mode, the controller may cause the printing unit to print an image in accordance with the image data stored in the storage unit in response to a print start command inputted through the input unit.

With this configuration, the user is able to cause the recording device to form the image in accordance with the image data and the print setting information stored in the storage unit after the data communication performed for the image data and the print setting information between the recording device and the external device is finished.

In the print and display mode or in the single display mode, the controller may store print setting information in the storage unit based on the print setting information inputted through the input unit.

By inputting print settings to the recording unit through the user interface, the user is able to update the print setting information stored in the storage unit. After update, the controller causes the recording unit to form an image based on the updated print setting information. That is, after data communication between the external device and the recording device is finished, the user is able to change the print settings and form an image based on the newly designated print settings.

In the print and display mode or in the single display mode, the controller may execute image processing on the image data stored in the storage unit, displays an image corresponding to the processed image data, and stores the processed image data in the storage unit in response to a command for image processing inputted through the input unit.

By inputting desirable commands to the recording device through the user interface, the user is able to perform image processing for the image data in the storage unit. Since the image corresponding to the processed image data is displayed, the used is able to check the processed image on the display unit. Such a configuration enables the user to cause the recording device to perform image processing and to record the processed image after data communication between the external device and the recording device is finished.

In the print and display mode or in the single display mode, the controller may judge whether the storage unit has storing area for storing the image data from the external device before storing the image data; and transmit a notification indicating that printing is inexecutable to the external device through the communication unit if it is judged that the storage unit does not have the free space for storing the image data and the print setting information.

Because there is a possibility that the storage unit does not have free space for storing the image data and the print setting information because various type of information can be stored in the storage unit, such a configuration enables the external device to display an error message indicating that the printing is inexecutable. Therefore, the user is able to know that the printing is inexecutable if current print settings are used.

According to another aspect of the invention there is provided an image forming system in which a printing device is connected to an external device. The external device comprises a capture unit configured to capture an image, a media controller configured to store the captured image in memory, an inputting unit configured to input a print request of the captured image, a first communication unit configured to communicate with the external device, and a first controller configured to transmit a print request of the captured image and to transmit the captured image to a connected printer. The printing device comprises a second communication unit configured to receive a print execution instruction, a display unit on which an image is displayed, a printing unit configured to print an image on a recording medium, a storage unit; and a controller that causes the printing unit to print an image on the recording medium in accordance with the image data, stores the image data in the storage unit, and displays an image corresponding to the image data on the display unit in response to the print execution instruction.

According to the image forming system, image data, print setting information and various types of commands can be sent from the external device to the recording device. It is possible to set the controller for the print and display mode. By setting the controller for the print and display mode, an image corresponding to image data transmitted from the external device is formed on a recording medium. By finishing the recording of the image, data transmission from the external device is also finished. By storing the image data and the print setting information in the storage unit, the controller becomes able to cause the recording unit to record the image in accordance with the image data and the print setting information stored in the storage unit. Because the image corresponding to the image data stored in the storage unit is displayed, a user is able to check the image on the display unit.

According to another aspect of the invention, there is provided an image forming system in which a printing device is connected to an external device. The external device comprises a capture unit configured to capture an image, a media controller configured to store the captured image in memory, an inputting unit configured to input a print request of the captured image, a first communication unit configured to communicate with the external device; and a first controller configured to transmit a print request of the captured image and to transmit the captured image to a connected printer. The printing device comprises a second communication unit configured to receive a print execution instruction, a display unit on which an image is displayed, a printing unit configured to print an image on a recording medium, a storage unit; and a controller that stores the image data in the storage unit, displays an image corresponding to the image data on the display unit, and transmits print end information to the external device.

According to the image forming system, image data, print setting information and various types of commands can be sent from the external device to the recording device. It is possible to set the controller for the single display mode. By setting the controller to the single display mode, image data and print setting information are stored in the storage unit without causing the recording unit to record the image. Since the image corresponding to the image data stored in the storage unit is displayed, a user is able to check the image on the display unit. After data transmission from the external device is finished, the controller transmits the print end information to the external device. By receiving the print end information, the external device terminates the data communication based on the predetermined communication protocol. Thereafter, the user is able to cause the recording device to form the image corresponding to the image data stored in the storage unit or to perform image processing on the image. Such a configuration enables the recording device to communicate with the external device using a standard communication protocol, and thereby support a wide range of external devices employing a standard communication protocol.

In the above-mentioned two aspects of the image forming system, the controller of the recording device may further support execution of a single print mode in which the controller causes the printing unit to print an image on the recording medium in accordance with the image data stored in the storage unit.

By setting the controller for the single print mode, it is possible to cause the recording unit to record the image without storing the image data and the print setting information if there is no necessity to display the image on the display unit of the recording device.

The printing device may further comprise an input unit. In the print and display mode or in the single display mode, the controller of the recording device may cause the printing unit to print an image in accordance with the image data stored in the storage unit in response to a print start command inputted through the input unit.

With this configuration, the user is able to cause the recording device to form the image in accordance with the image data and the print setting information stored in the storage unit after the data communication performed for the image data and the print setting information between the recording device and the external device is finished.

In the print and display mode or in the single display mode, the controller of the recording device may stores print setting information in the storage unit based on the print setting information inputted through the input unit.

By inputting print settings to the recording device through the user interface, the user is able to update the print setting information stored in the storage unit. After update, the controller causes the recording unit to form an image based on the updated print setting information. That is, after data communication between the external device and the recording device is finished, the user is able to change the print settings and form an image based on the newly designated print settings.

In the print and display mode or in the single display mode, the controller of the recording device may execute image processing on the image data stored in the storage unit, displays an image corresponding to the processed image data, and stores the processed image data in the storage unit in response to a command for image processing inputted through the input unit.

By inputting desirable commands to the recording device through the user interface, the user is able to perform image processing for the image data in the storage unit. Since the image corresponding to the processed image data is displayed, the used is able to check the processed image on the display unit. Such a configuration enables the user to cause the recording device to perform image processing and to record the processed image after data communication between the external device and the recording device is finished.

In the print and display mode or in the single display mode, the controller of the recording device may judge whether the storage unit has storing area for storing the image data from the external device before storing the image data, and to transmit a notification indicating that printing is inexecutable to the external device through the communication unit if it is judged that the storage unit does not have the free space for storing the image data and the print setting information. In this case, the external device may move to a standby mode after receiving the notification indicating that printing is inexecutable.

Because there is a possibility that the storage unit does not have free space for storing the image data and the print setting information because various type of information can be stored in the storage unit, such a configuration enables the external device to display an error message indicating that the printing is inexecutable. Therefore, the user is able to know that the printing is inexecutable if current print settings are used.

According to another aspect of the invention, there is provided a method of forming an image in a system in which a recording device is connected to an external device. The method comprises the steps of recording an image on the recording device in accordance with image data and print setting information transmitted from the external device, storing the image data and the print setting information in a storage medium in the recording device, and displaying an image corresponding to the image data stored in the storage medium on a display of the recording device.

According to the above-mentioned method, image data, print setting information and various types of commands can be sent from the external device to the recording device. An image corresponding to image data transmitted from the external device is formed on a recording medium. By finishing the recording of the image, data transmission from the external device is also finished. By storing the image data and the print setting information in the storage medium, the recording device becomes able to record the image in accordance with the image data and the print setting information stored in the storage medium. Because the image corresponding to the image data stored in the storage medium is displayed, the user is able to check the image on the display unit.

According to another aspect of the invention, there is provided a method of forming an image in a system in which a recording device is connected to an external device. The method comprises the steps of storing image data and print setting information transmitted from the external device in a storage medium of the recording device, displaying an image corresponding to the image data stored in the storage medium on a display of the recording device; transmitting print end information from the recording device to the external device in accordance with a predetermined communication protocol; and moving the external device, which received the print end information, to a standby state.

According to the above-mentioned method, image data, print setting information and various types of commands can be sent from the external device to the recording device.

Because the recording device stores image data and print setting information in the storage medium without recording the image, it becomes possible to record an image based on the image data and the print setting information in the storage medium. Since the image corresponding to the image data stored in the storage medium is displayed, a user is able to check the image on the display unit. After data transmission from the external device is finished, the recording device transmits the print end information to the external device. By receiving the print end information, the external device terminates the data communication based on the predetermined communication protocol. Thereafter, the user is able to cause the recording device to form the image corresponding to the image data stored in the storage unit or to perform image processing on the image. Such a configuration enables the recording device to communicate with the external device using a standard communication protocol, and thereby support a wide range of external devices employing a standard communication protocol.

In at least one aspect, the method further comprises the step of recording an image on the recording device in accordance with the image data and the print setting information stored in the storage medium in response to a print start command inputted to the recording device.

With this configuration, the user is able to cause the recording device to form the image in accordance with the image data and the print setting information stored in the storage medium after the data communication performed for the image data and the print setting information between the recording device and the external device is finished.

In at least one aspect, the method further comprises the step of updating the print setting information in the storage medium in accordance with print settings inputted to the recording device.

By inputting print settings to the recording device, the user is able to update the print setting information stored in the storage medium. After update, the recording device forms an image based on the updated print setting information. That is, after data communication between the external device and the recording device is finished, the user is able to change the print settings and forms an image based on the newly designated print settings.

In at least one aspect, the method further comprises the steps of executing, on the recording device, image processing for the image data stored in the storage medium, and displaying an image corresponding to the image data processed by the image processing on the display of the recording device.

By inputting desirable commands to the recording device, the user is able to perform image processing for the image data in the storage medium. Since the image corresponding to the processed image data is displayed, the user is able to check the processed image on the display unit.

In at least one aspect, the method further comprises the steps of judging, on the recording device, whether the storage medium has free space for storing the image data and the print setting information transmitted from the external device before storing the image data and the print setting information in the storage medium, transmitting a notification indicating that printing is inexecutable from the recording device to the external device if it is judged that the storage medium does not have the free space for storing the image data and the print setting information, and moving the external device, which received the notification, to a standby state.

Because there is a possibility that the storage medium does not have free space for storing the image data and the print setting information because various type of information can be stored in the storage medium, such a configuration enables the external device to display an error message indicating that the printing is inexecutable. Therefore, the user is able to know that the printing is inexecutable if current print settings are used.

According to another aspect of the invention, there is provided a computer usable medium having computer readable instructions stored thereon, which, when executed by a computer connected to an external device, is configured to record an image in accordance with image data and print setting information transmitted from the external device, to store the image data and the print setting information in a storage medium; and to display an image corresponding to the image data stored in the storage medium on a display.

According to the above-mentioned computer usable medium, image data, print setting information and various types of commands can be sent from the external device to the recording device. An image corresponding to image data transmitted from the external device is formed on a recording medium. By finishing the recording of the image, data transmission from the external device is also finished. By storing the image data and the print setting information in the storage medium, the recording device becomes able to record the image in accordance with the image data and the print setting information stored in the storage medium. Since the image corresponding to the image data stored in the storage medium is displayed, the user is able to check the image on the display unit.

According to another aspect of the invention, there is provided a computer usable medium having computer readable instructions stored thereon, which, when executed by a computer connected to an external device, is configured to store image data and print setting information transmitted from the external device in a storage medium, to display an image corresponding to the image data stored in the storage medium on a display; and to transmit print end information to the external device in accordance with a predetermined communication protocol.

According to the above-mentioned computer usable medium, image data, print setting information and various types of commands can be sent from the external device to the recording device. Since the recording device stores image data and print setting information in the storage medium without recording the image, it becomes possible to record an image based on the image data and the print setting information in the storage medium. Since the image corresponding to the image data stored in the storage medium is displayed, a user is able to check the image on the display unit. After data transmission from the external device is finished, the recording device transmits the print end information to the external device. By receiving the print end information, the external device terminates the data communication based on the predetermined communication protocol. Thereafter, the user is able to cause the recording device to form the image corresponding to the image data stored in the storage unit or to perform image processing on the image. Such a configuration enables the recording device to communicate with the external device using a standard communication protocol, and thereby support a wide range of external devices employing a standard communication protocol.

Illustrative Embodiments

Hereafter, an illustrative embodiment according to the invention will be described with reference to the accompanying drawings.

FIG. 1 shows an outer appearance of an image forming system 1 according to an embodiment of the invention. As shown in FIG. 1, the image forming system 1 includes a digital camera 2 and a printer 3 which are capable of communicating with each other via a USB (Universal Serial Bus) cable 4. Although in this embodiment a USB is used as a communication interface between the printer 3 and the digital camera 2, various types of wired or wireless communications, such as an IEEE 1394, an IEEE 802.11, Bluetooth®, or a wireless USB, may be additionally or alternatively adapted as a communication interface between the printer 3 and the digital camera 2.

In FIG. 1, a rear view of the digital camera 2 is illustrated. On a front side of the digital camera 2, an optical unit 21 including a lens for forming an image on an image pickup device, such as a CCD (Charge Coupled device) 20, is provided. On a top surface of the digital camera 2, a release button 22 to be pressed to make an exposure is provided. On the rear surface of the digital camera 2, a finder 23, an LCD 24 and various types of operation buttons 25 are located.

Figure 2:
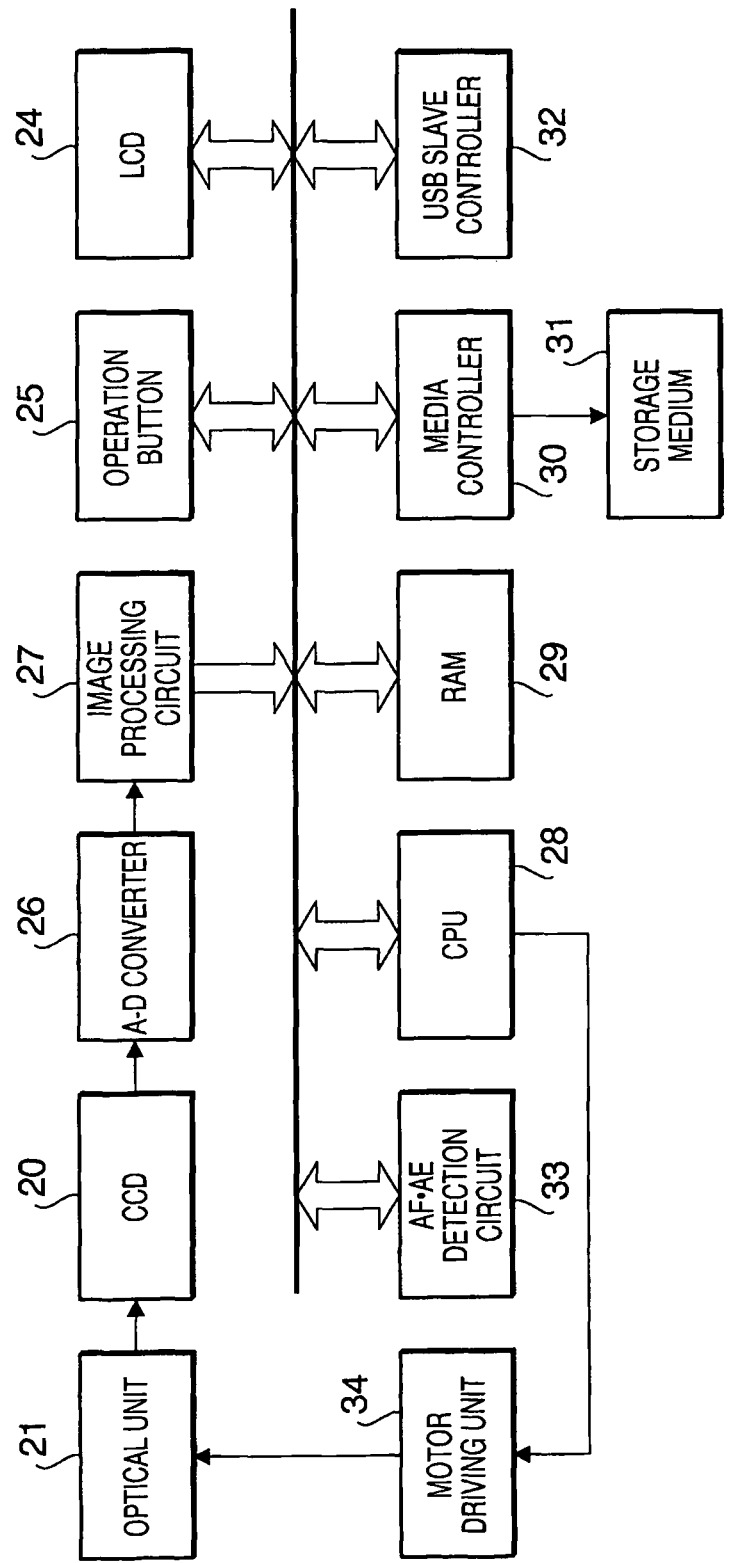
FIG. 2 shows a block diagram of a control system of a digital camera provided in the image forming system shown in FIG. 1.

FIG. 2 shows a block diagram of a control system of the digital camera 2. An image of an object is formed by the optical unit 21 on the CCD 20. The image formed on the CCD 20 is converted to an electric signal (an analog image signal). The analog image signal is converted by an A-D converter 26 to digital image data. Then, in an image processing circuit 27, the image data is subjected to image processing including a sampling process, a noise reduction process and image data compression.

The digital camera 2 includes a CPU (Central Processing Unit) 28 which controls functions of the digital camera 2, a RAM 29 used by the CPU 28 as a work memory, a media controller 30 which controls access to a storage medium 31, such as a smart media® or a compact flash®, in which image data is stored, and a USB slave controller 32 which controls data communication with an external device (e.g., the printer 1) in accordance with a USB standard. Further, the digital camera 2 has an AF/AE detection circuit 33 which controls an automatic focusing function and an automatic exposure function, and a motor driving unit 34 which drives the lens of the optical unit 21 in an automatic focusing operation. The image processing circuit 27, the CPU 28, the RAM 29, the LCD 24, the operation buttons 25, the media controller 30, the USB slave controller 32, and the AF/AE detection circuit 33 are connected to each other via a bus 35.

Image data of images picked up by the digital camera 2 are stored in the storage medium 31. The digital camera 2 is operated by a user as follows. First, the user turns the digital camera 2 to on, and looks at an object through the finder 23 or the LCD 24. When the release button 22 is pressed halfway, the automatic exposure and the automatic focusing are activated, and the shutter speed and exposure value are determined. Then, the lens of the optical unit 21 is driven so that focus is achieved. By fully pressing the release button 22, the image formed on the CCD 20 is converted to an image signal.

The image signal obtained by photoelectric conversion performed by the CCD 20 is converted into the image data, and the image data is stored in the storage medium 31. The photo shooting is thus performed in the digital camera 2. The image data generated as above may be stored in the RAM 29 or another internal memory (not shown) of the digital camera 2.

The printer 3 is a multifunction device (MFD) having a printing function, a scanner function, a copying function and a facsimile function. The printer 3 has an interface (e.g., a USB interface) connectable to various types of devices, such as a computer, in addition to connectable to the digital camera 2. By connecting the printer 3 to a computer, the printer 3 is able to print out images and documents transmitted from the computer on recording sheets. The printer 3 may be configured to have only a printing function.

As shown in FIG. 1, the printer 3 has an outer appearance formed in a thin, box-shape including a printing unit 5 on its lower side. An opening 6 is formed on a front side of the printing unit 5 so that a part of each of a sheet tray 40 and a sheet ejection tray 41 is exposed through the opening 6. On the sheet tray 40, a stack of sheets is placed. Various types of sheets including a post card, an A4 size sheet and a B5 size sheet can be placed on the sheet tray 40. An area of a upper surface portion of the sheet tray 40 can be extended by withdrawing a slide tray 42 slidably attached to the sheet tray 40. A sheet placed on the sheet tray 40 is fed into the inside of the printing unit 5, and an image is formed on the sheet. Then, the sheet on which an image is formed is ejected to the sheet ejection tray 41.

Figure 3:
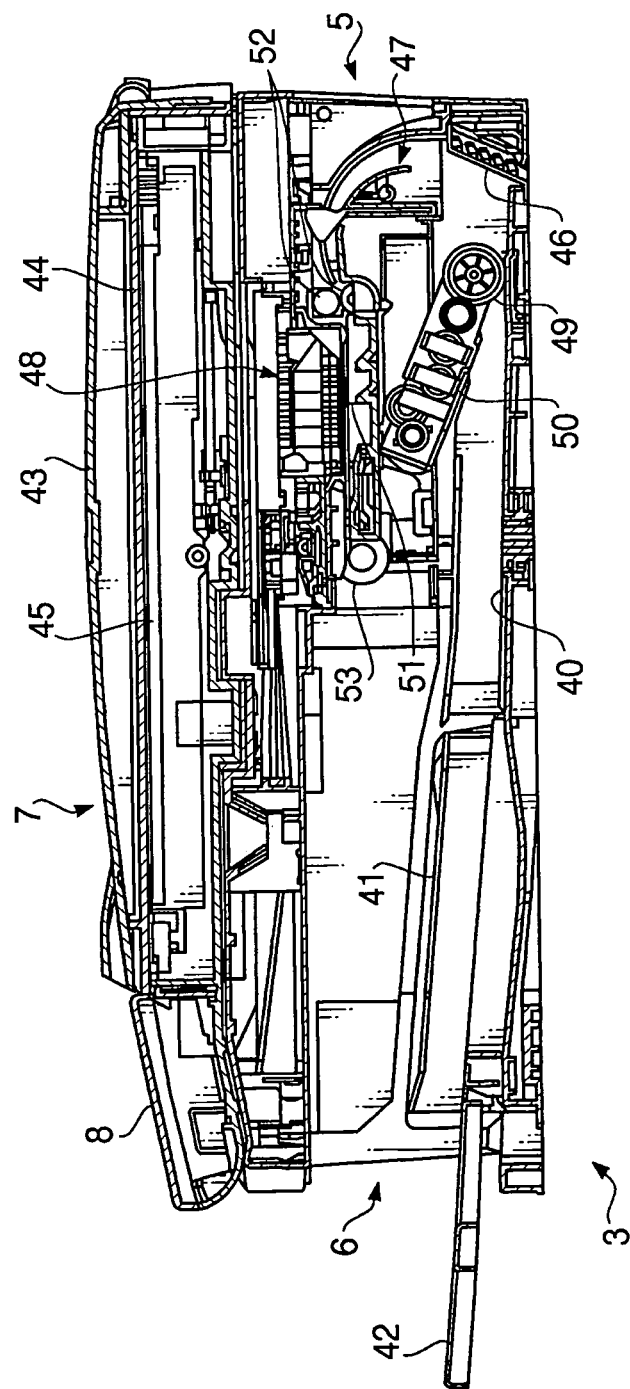
FIG. 3 is a cross sectional side view, which shows an inside structure of a printer provided in the image forming system according to aspects of the invention.

On the upper side of the printer 3, a scanner unit 7 is located. That is, the scanner unit 7 is formed as a flat-type scanner. As shown in FIGS. 1 and 3, a scanner cover 43 is attached to the printer 3 to cover the top surface of the printer 3. The scanner cover 43 also functions as an openable and closable top plate. Under the scanner cover 43, a platen glass 44 and an image sensor (CIS) 45 are located. On the platen glass 44, an original for which an image reading operation is performed is placed. The image sensor 45 is located under the platen glass 44 so as to scan an original placed on the platen glass 44 in a main scan direction which is a front and rear direction in FIG. 1. The image sensor 45 is mounted on a scanning carriage which is also movable in a width direction of the printer 3 by a driving force from a carriage motor.

On the front upper side of the printer 3, an operation panel 8 to be use by a user to control the printing unit 5 and the scanner unit 7 is located. The operation panel 8 includes various types of keys 9 and an LCD 10. The printer 3 is configured to operate in accordance with instructions inputted through the operation panel 8. If the printer 3 is connected to a computer, the printer 3 is also able to execute instructions inputted from the computer via a printer driver or a scanner driver running on the computer.

On the upper left side of the printer 3, a slot 11 into which various types of storage media, such as a smart media or a compact flash, can be inserted is located. When a storage medium is inserted into the slot 11, the printing unit 5 is able to read image data from the storage medium, and to print an image corresponding to the image data on a recording sheet.

FIG. 3 is a cross section of the printer 3 illustrating an inside structure of the printer 3. As shown in FIG. 3, the sheet tray 40 is located at the bottom of the printer 3. On the rear side of the sheet tray 40, a separation tilt plate 46 is located. The separation tilt plate 46 serves to separate a sheet from the stack of sheets and guides the separated sheet toward an upper side. A sheet carrying path 47 having a form of the horizontally oriented letter U is formed to connect the sheet tray 40 and the sheet ejection tray 41. More specifically, the sheet carrying path 47 is bent from the separation tilt plate 46 toward the upper side, and then is bent again to the left side so as to extend in a horizontal direction toward the front side and to finally communicate with the sheet ejection tray 41 through an image formation point of a recording head 48.

With this configuration, a sheet placed on the sheet tray 40 is guided by the sheet carrying path 47 to U-turn from the lower side toward the upper side, and reaches the image formation point. After an image is formed on the sheet by the recording head 48, the sheet is ejected to the sheet ejection tray 41. A part of the sheet carrying unit 47, except for a position at which the recording head 48 is placed, is formed by an outer guide surface and an inner guide surface which face to each other at a certain interval.

On the upper side of the sheet tray 40, a sheet supply roller 49 is provided. The sheet supply roller 49 is held by a shaft mounted at a tip of a sheet supply arm 50 which is movable in a vertical direction so as to be capable of contacting with and deviating from the sheet tray 40. The sheet supply roller 49 is rotated by a carrying motor. By the rotation of the sheet supply roller 49, the stack of sheets placed on the sheet tray 40 is carried toward the sheet carrying path 47 one-by-one. The sheet carried by the sheet supply roller 49 contacts the separation tilt plate 46, is guided toward the upper side by the separation tilt plate 46, and is supplied to the sheet carrying path 47. When the top sheet of the stack of sheets is carried by the sheet supply roller 49, some sheets may be supplied to the separation tilt plate 47 at the same time due to friction force or electric static force acting between sheets. However, such sheets carried with the top sheet are prevented from being carried toward the sheet carrying path 47 by the effect of the separation tilt plate 46.

The recording head 48 is mounted on a scanning carriage to reciprocate in a direction perpendicular to a sheet carrying direction. To the recording head 48, cyan ink, magenta ink, yellow ink and black ink are supplied through respective ink tubes from an ink cartridge accommodated in the printer 3. Nozzles are formed on the bottom surface of the recording head 48 so that minute drops of ink are ejected from the nozzles and the drops of ink ejected from the nozzles fall on a recording sheet on a platen 51.

On the upstream side of the recording head 48, a pair of carrying rollers 52 is located. The carrying rollers 52 carry the sheet to the platen 51, sandwiching the sheet being carried along the sheet carrying path 49 therebetween. On the downstream side of the recording head 48, a pair of ejection rollers 53 is located. The ejection rollers 53 carry the sheet on-which the image has been formed, while sandwiching the sheet threrebetween. Each of the carrying rollers 52 and the ejection rollers 53 is driven by a carrying motor so as to be rotated on an intermittent basis (i.e., based on a predetermined line feed length). By receiving the driving force of the carrying rollers 52 or the ejection rollers 53, the sheet is carried based on a predetermined line feed length. Each time the sheet is moved by a predetermined line feed length, the recording head 48 performed a reciprocating motion while ejecting ink, so that an image is formed on the sheet being carried over the platen 51.

Figure 4:
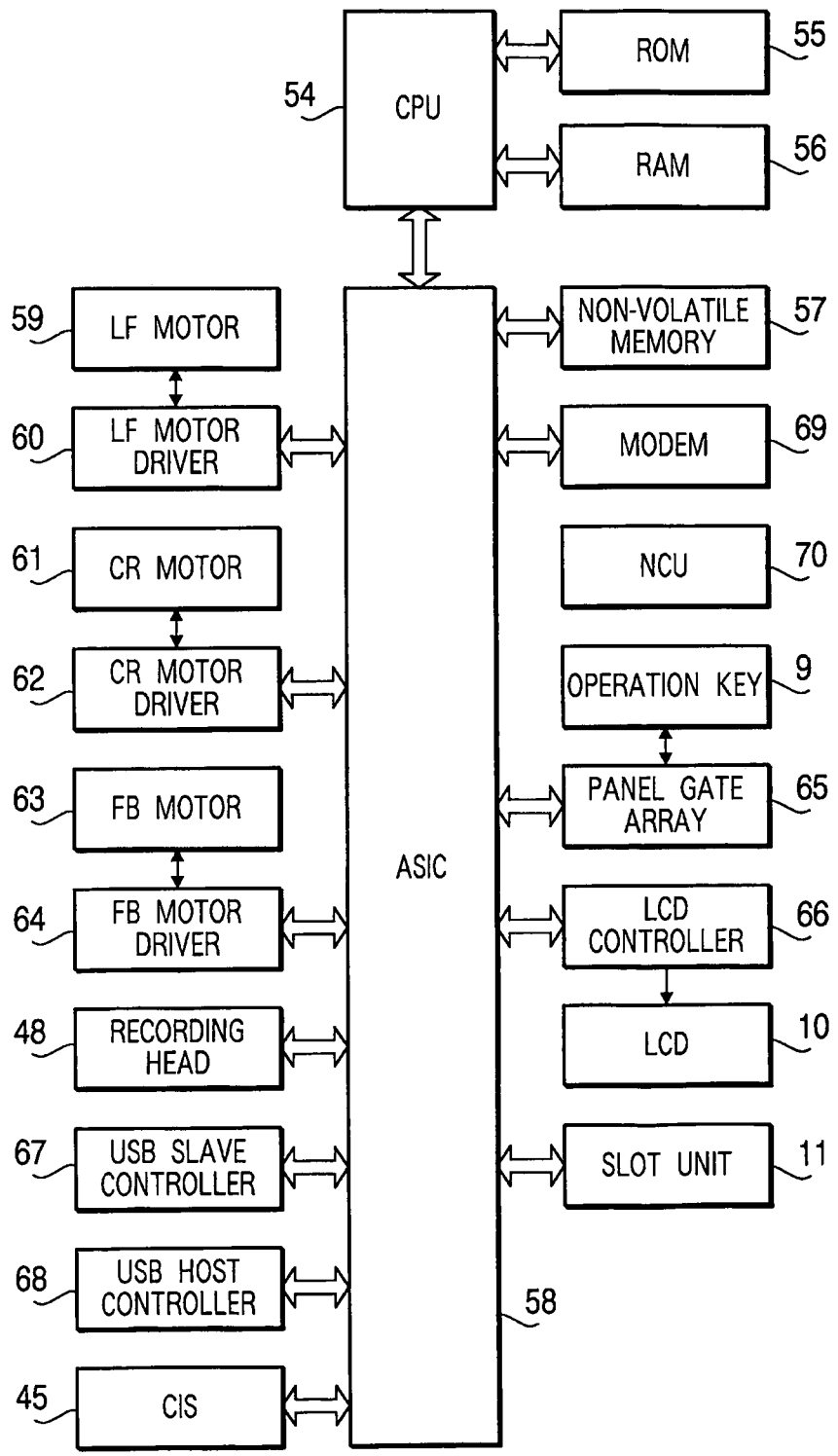
FIG. 4 is a block diagram of a control system of the printer provided in the image forming system according to aspects of the invention.

FIG. 4 is a block diagram of a control system of the printer 3. As shown in FIG. 4, the printer 3 includes a CPU 54, a ROM 55, a RAM 56, a non-volatile memory 57, and an ASIC (Application Specific Integrated Circuit) 58. The CPU 54, the ROM 55, the RAM 56, the non-volatile memory 57, and the ASIC (Application Specific Integrated Circuit) 58 are mounted on a control circuit board in the printer 3.

In the ROM 55, various control programs controlling the functions of the printer 3 are stored. The RAM 56 is used as a work memory for execution of the programs by the CPU 54. The RAM 56 is also used to temporarily store image data and various types of data to be displayed on the LCD 10. In the non-volatile memory 57, various types of data, for example, a print mode to be used when the digital camera 2 is connected to the printer 3, are stored.

The ASIC 58 generates a phase excitation signal to be supplied to a LF (carrying) motor 59, in accordance with instructions from the CPU 54. The ASIC 58 supplies the phase excitation signal to a LF motor driver 60 so as to drive the LF motor 59 through the LF motor driver 60. The driving force of the LF motor 59 is transmitted to, for example, the carrying rollers 52. The ASIC 58 also generates a phase excitation signal to be supplied to a CR (carriage) motor 61, in accordance with instructions from the CPU 54. The ASIC 58 supplies the phase excitation signal to a CR motor driver 62 so as to drive the CR motor 60 through the CR motor driver 62. The driving force of the CR motor 62 is transmitted to the carriage on which the recording head 48 is mounted.

The ASIC 58 also generates a phase excitation signal to be supplied to a reading FB (Flat Bead) motor 63, in accordance with instructions from the CPU 54. The ASIC 58 supplies the phase excitation signal to an FB motor driver 64 so as to drive the FB motor 63 through the FB motor driver 64. The driving force of the FB motor 63 is transmitted to the carriage on which the image sensor 45 is mounted.

The ASIC 58 controls the image sensor 45 to emit light at predetermined timing and to output data from the image sensor 45 at predetermined timing. The ASIC 58 also controls the recording head 48 to eject drops of ink on a recording sheet at predetermined timing in accordance with instructions from the CPU 54.

To the ASIC 58, a panel gate array 65 configured to control operation keys 9 used to input instructions to the printer 3, an LCD controller 66 which controls image display on the LCD 10, and the slot 11 to which a small memory card is inserted, a USB slave controller 67 used for data communication with an external computer through a USB cable, a USB host controller 68 for data communication with the digital camera 2, a modem 69 used for facsimile communication and an NCU (Network Control Unit) 70 are connected.

Hereafter, an operation for recording images on recording media based on image data stored in the digital camera 2 is explained. As described above, image data of images shot by the digital camera 2 is stored in the storage medium 31 of the digital camera 2. Since the digital camera 2 and the printer 3 (i.e., the USB slave controller 32 and the USB host controller 68) are connected to each other via the USB cable 4, the digital camera 2 is able to send various types of data such as image data, print settings and various commands to the printer 3.

The data communication between the digital camera 2 and the printer 3 is based on a predetermined protocol. For example, a communication standard "PictBridge" may be used for data communication between the digital camera 2 and the printer 3. When the digital camera 2 and the printer 3 are connected to each other via the USB cable 4, each of the digital camera 2 and the printer 3 executes a program for data communication. Then, the digital camera 2 detects the printer 3, and the printer 3 detects the digital camera 2. Next, the digital camera 2 and the printer 3 move to a negotiation process. In the negotiation process, the digital camera 2 and the printer 3 exchange device information with each other. For example, by the negotiation process, the digital camera 2 obtains information to be used for print settings.

Figure 5:
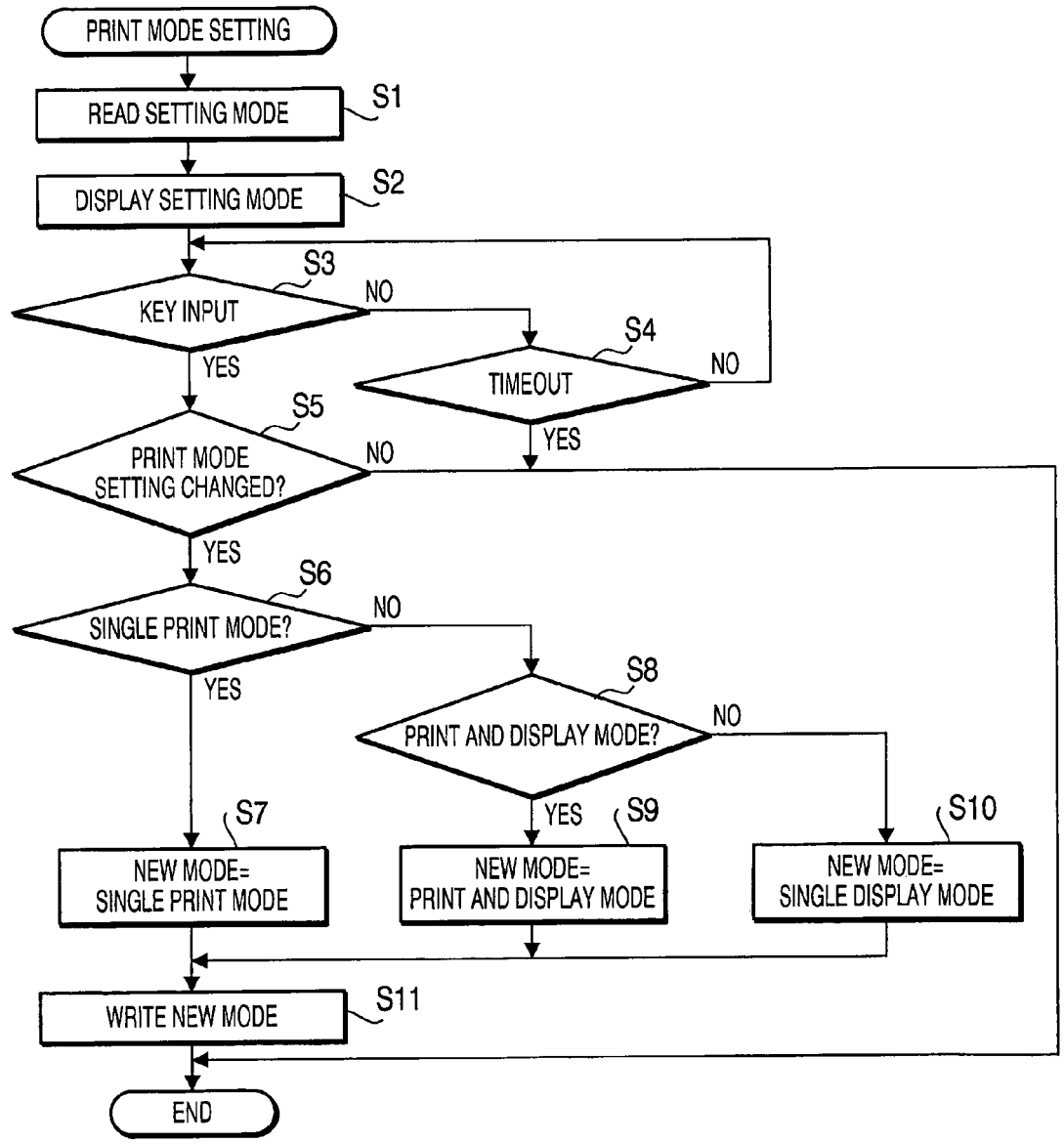
FIG. 5 is a flowchart illustrating the print mode setting process according to aspects of the invention.

Settings for a print mode are set in advance to the printer 3 by a user through use of the operation key 9. FIG. 5 is a flowchart illustrating a print mode setting process performed under control of the CPU 54 of the printer 3. When the digital camera 2 is connected to the printer 3, the printer 3 reads a setting mode stored in the non-volatile memory 57 (step S1). Then, the setting mode read in step S1 is displayed on the LCD 10. Connection of the digital camera 2 to the printer 3 is detected by a control program which causes the CPU 54 to detect whether the digital camera 2 is connected to the USB host controller 68 via the USB cable 4.

After displaying the setting mode on the LCD 10, the printer 3 judges whether an input is received through the operation keys 9 (step S3). The printer 3 waits for an input through the operation keys 9 for a certain time period (S3: NO, S4: NO) If an input is not received through the operation keys 9 in a certain time period (step S3: NO and step S4: YES), the print mode setting process terminates.

If an input is received through the operation keys 9 within a certain time period (S3: YES), the printer 3 judges whether the input corresponds to a command for changing the print mode (step S5). If the input corresponds to a command for changing the print mode (S5: YES), a new print mode is set to the printer as follows. In the printer 3, one of a single print mode, a print and display mode, and a single display mode can be selected. If the input received through the operation keys 9 corresponds to the single print mode (step S6: YES), the single print mode is set to the printer 3 (step S7), and the single print mode is written in the non-volatile memory 57 as the print mode (step S11).

If the input does not correspond to the single print mode (step S6: NO), control proceeds to step S8 where the printer 3 judges whether the input corresponds to the print and display mode. If the input corresponds to the print and display mode (S8: YES), the print and display mode is set to the printer 3 (step S9), and the print and display mode is written in the non-volatile memory 57 as the print mode (step S11). If the input does not correspond to the print and display mode (S8: NO), the single display mode is set to the printer 3 (step S10), and the single display mode is written in the non-volatile memory 57 as the print mode (step S11).

By connecting the digital camera 2 to the printer 3, the digital camera 2 is able to move to a direct print mode. The digital camera 2 may be configured to automatically move to the direct print mode when connection to the printer 3 is detected by the CPU 28, or to move to the direct print mode when the operation buttons 25 are operated by the user. After the print mode setting process is completed on the printer 3, the digital camera 2 becomes able to select images stored in the storage medium 31.

The user operates the operation buttons 25 of the digital camera 2 to display images corresponding to the image data stored in the storage medium 31 on the LCD 24. Then, the user selects one of the images to display the selected image on the LCD 24. Then, the user inputs a command for completion of the image selection by pressing the operation buttons 25. Images to be printed are thus selected.

On the LCD 24 of the digital camera 2, selectable print settings, such as recording sheet sizes, sheet types, rimless setting, and the number of copies are displayed so as to allow the user to make settings for these items. The "recording sheet sizes" include, for example, "L size" and "A4 size". The recording sheet types include, for example, "a plain paper" and "glazed paper". The rimless setting indicates that an image is formed on the entire surface of a recording sheet. The rimless setting is selectable on the digital camera 2 if the printer 3 connected to the digital camera 2 supports rimless printing. It should be noted that various types of print settings other than the "recording sheet sizes", "the recording sheet types", "the rimless setting" and "the number of copies" may be settable on the display 24 of the digital camera 2. Alternatively or additionally, a preprogrammed easy print mode may be prepared in advance in the digital camera 2 and the printer 3. For example, the digital camera 2 may be configured to allow the user to select an easy print mode in which use of settings "glazed paper", "L size" and "rimless printing" is preprogrammed.

Next, the user inputs a command for print start by operating the operation buttons 25 of the digital camera 2. By this operation, print start information is sent from the digital camera 2 to the printer 3 in accordance with the predetermined protocol. After receiving the print start information, the printer 3 requests the selected images and the print setting information from the digital camera 2. Then, the image data of the selected images and the print setting information are sent from the digital camera 2 to the printer 3. It should be understood that whether the request for the selected images and the print setting information is issued by the printer 3 or the digital camera 2 is based on the communication protocol used by the digital camera 2 and the printer 3, although in this embodiment such a request is issued by the printer 3 in accordance with the adopted protocol. Therefore, in a different example, the digital camera 2 may be configured to generate a transmission command in response to a print start command inputted to the digital camera 2, and to transmit the image data of the selected images and the print setting information to the printer 3 as a transmission command.

Figure 6:
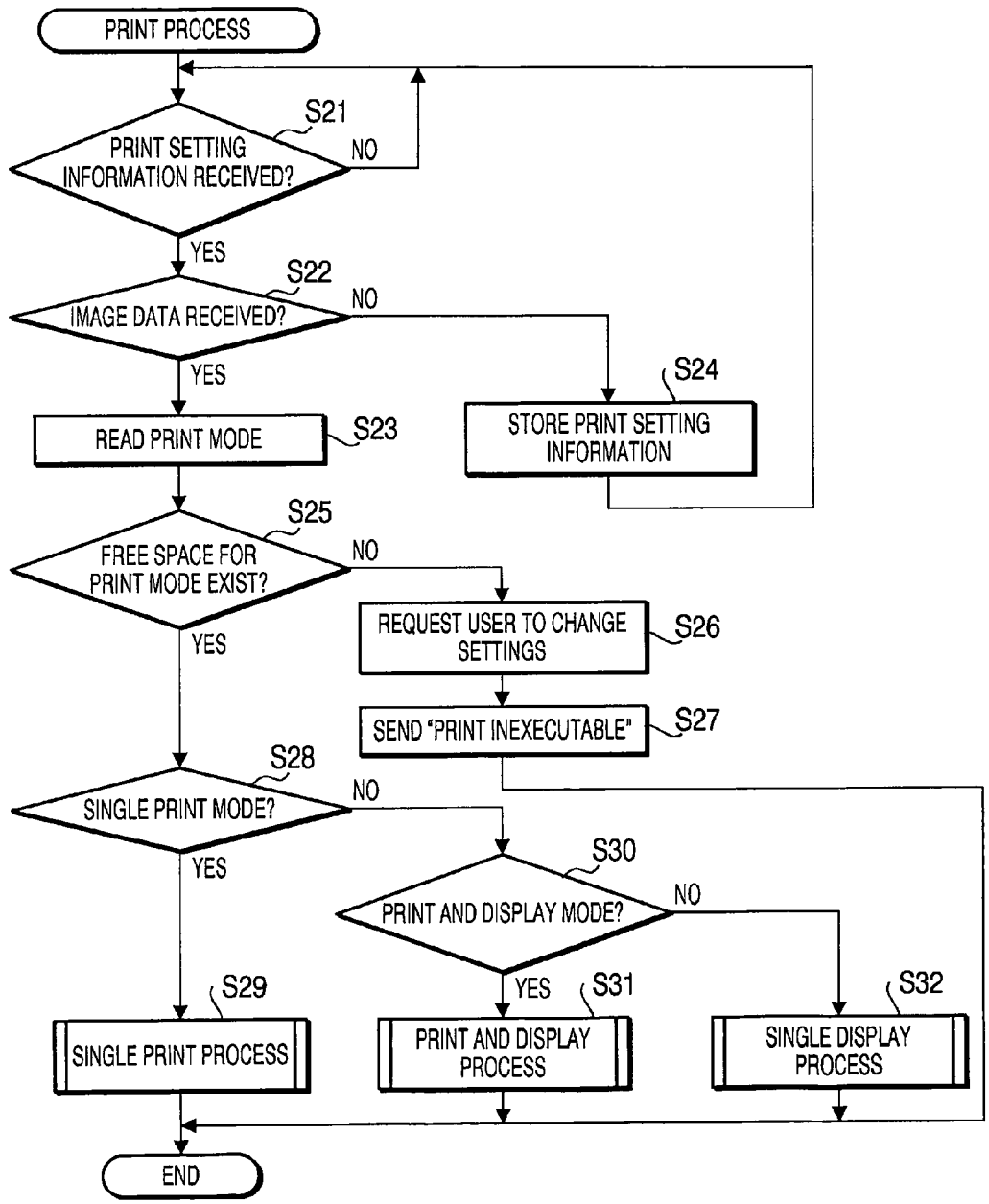
FIG. 6 is a flowchart illustrating a PRINT PROCESS executed by the printer shown in FIG. 4.

FIG. 6 is a flowchart illustrating a print process executed under control of the CPU 54 of the printer 3. The print process is executed in response to receipt of the image data and the print setting information from the digital camera 2. First, the printer 3 waits until the print setting information is transmitted from the digital camera 2 (step S21: NO). If the print setting information is received (step S21: YES and step S22: NO), the printer 3 stores the print setting information in the RAM 56 (step S24). Then, the printer 3 further waits for the image data (step S22). If the image data is received (step S22: YES), the printer 3 reads the print mode stored in the non-volatile memory 57.

After reading the print mode, the printer 3 judges whether the RAM 56 has free space for executing the current print mode (step S25). The RAM 56 of the printer 3 is used for storing the image data and the print setting information, in addition to being used for facsimile data, answerphone messages, and buffering of data. For example, a buffer area (a digital camera data buffer) for uncompressing image data and a buffer area (a recording buffer) for printing are required for the image recording for image data. In the print and display mode or the single display mode, a buffer area (a display buffer) for displaying an image based on the image data on the display 10 and a buffer area (an LCD display buffer) for zooming in or out on the image are required. Since the RAM 56 is used for storage of the above-mentioned various purposes, free space on the RAM 56 is checked in step S25.

If the printer 3 judges that the RAM 56 does not have free space for storing the image data and the print setting information and for buffer areas for the various processes (S25: NO), the printer 3 displays a notification requesting the user to change the print mode on the display 10 (step S26). Further, the printer 3 sends a notification indicating that the printing is inexecutable, to the digital camera 2 (step S27). After receiving the notification ("printing inexecutable"), the digital camera 2 terminates data communication with the printer 3. Then, the digital camera 2 returns to a standby state of allowing the user to select images and to make settings for printing. By the information displayed on the LCD 10, the user is able to know that use of the current print mode is inexecutable.

If the printer 3 judges that the RAM 56 has free space for storing the image data and the print setting information and for buffer areas for the various processes (S25: YES), the printer 3 recognizes the print mode, and executes one of the single print process (step S29), the print and display process (step S31) and the single display process (step S32).

Figure 7:
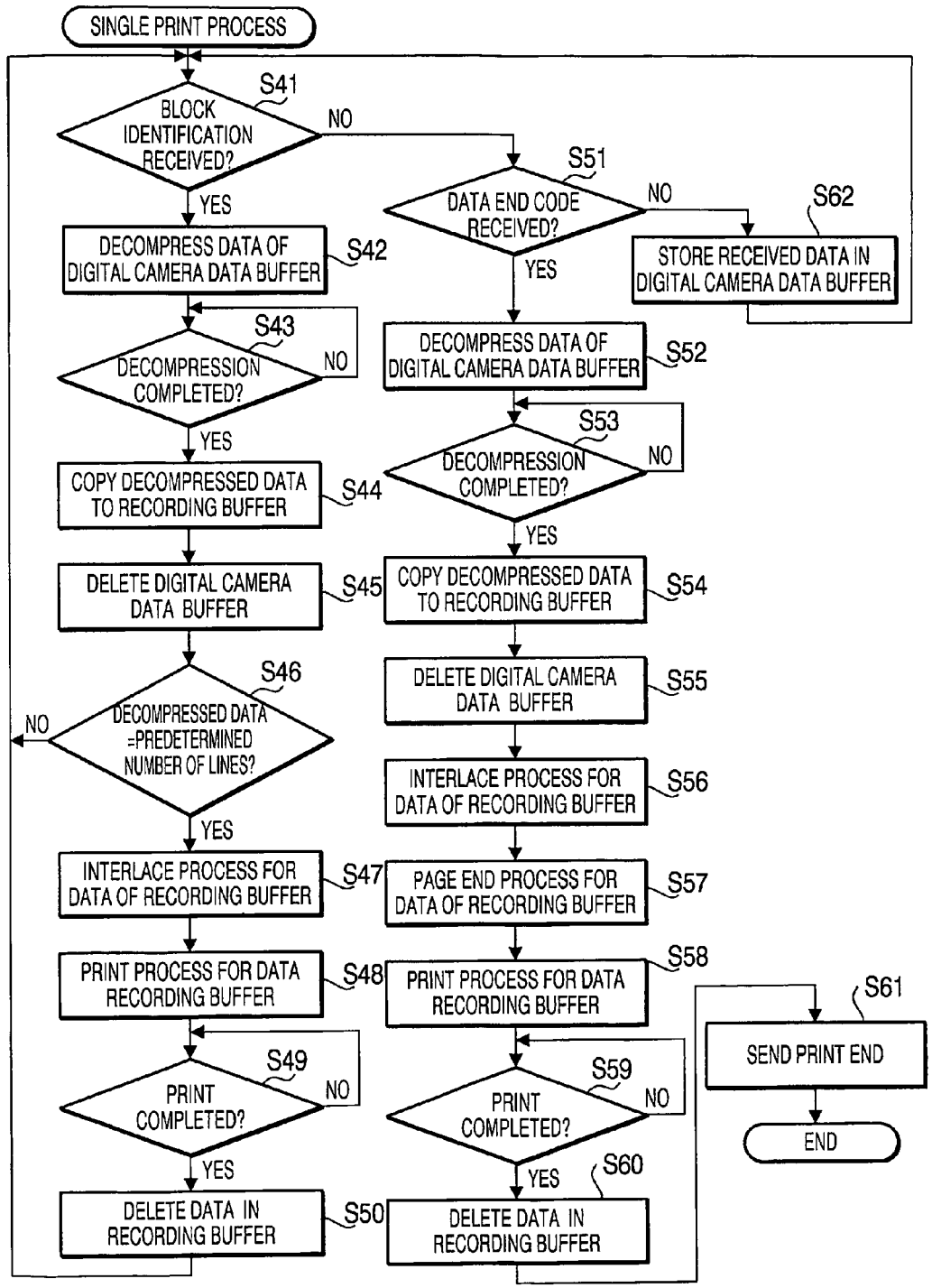
FIG. 7 is a flowchart illustrating a SINGLE PRINT PROCESS executed by the printer shown in FIG. 4.

Hereafter, the single print process is explained in detail with reference to FIG. 7. As described above, the single print process is executed in step S29 if the single print mode is set to the printer 3 as the print mode.

First, the printer 3 judges whether a block identification contained in the image data from the digital camera 2 is received (step S41). The block identification is an identification of each of blocks of compressed image data. The block identification is contained in a header part of each image data block. If the block identification is not received (step S41: NO), control proceeds to step S51 where the printer 3 judges whether a data end code contained in the image data from the digital camera 2 is received. The data end code is a delimiter representing ending of the image data of one image. The data end code is contained in a header part of an image data block. If the data end code is not received (S51: NO), the printer 3 stores the image data transmitted from the digital camera 2 in the digital camera data buffer assigned in the RAM 56 (step S62).

If the block identification is received (S41: YES), the printer 3 decompresses image data stored in the digital camera data buffer (step S42). For example, by the decompressing process, compressed image data (e.g., jpeg data) is extracted. Programs for decompressing are stored in the ROM 55, and the decompressing process is executed under control of the CPU 54. When finishing the decompressing process (S43: YES), the printer 3 copies the decompressed data to the recording buffer assigned in the RAM 56 (step S44). Then, the compressed image data stored in the digital camera buffer is deleted (step S45).

Next, the printer 3 judges whether the size of the decompressed data reaches a size corresponding to a predetermined number of lines (step S46). A "line" is equivalent to a main scanning path of the recording head 48 which reciprocates in a main scanning direction. The predetermined number of lines may be determined based on a unit of image recording operations of the recording head 48 (which is provided with the nozzles arranged in a plurality of lines in an auxiliary scanning direction) in interlace scanning.

If the size of the decompressed data does not reach the predetermined number of lines (step S46: NO), control returns to step S41 to continue to receive the image data from the digital camera 2. If the size of the decompressed data reaches the predetermined number of lines (step S46: YES), the printer 3 subjects the image data stored in the recording buffer to an interlace process so as to print an image corresponding to the data stored in the recording buffer using the recording head 48 (step S47). Then, the printer 3 prints out the image corresponding to the predetermined number of lines by driving the recording head 48 (step S48). It should be noted that sheets corresponding to the sheet size and the sheet type transmitted form the digital camera 2 are selected in advance.

When the image printing corresponding to the predetermined number of lines is finished (step S49: YES), the printer 3 deletes the data in the recording buffer (step S50). Then, control returns to step S41 to continue to receive the image data from the digital camera 2. The above-mentioned operation in which the image recording is performed for each data unit corresponding to the predetermined number of lines is repeated until the data end code is received.

If the printer 3 receives the data end code (S51: YES), the printer 3 decompresses the image data stored in the digital camera data buffer (step S52). If the decompressing process is finished (S53: YES), the printer 3 copies the decompressed data to the recording buffer (step S54). Then, the printer 3 deletes the data in the digital camera data buffer (step S55).

Next, the printer 3 subjects the data in the recording buffer to the interlace process so as to print the image through use of the recording head 48 (step S56). Further, the printer 3 executes a page end process for the data (step S57). For example, for printing an image in the rimless setting, it is impossible to perform the printing operation using the entire nozzles on the recording head 48 at the rear edge part of a recording sheet in the interlace scan. Therefore, at the rear edge part of the recording sheet, a scanning operation different from the interlace scan is required. In the page end process, the printer 3 caused the recording head 48 to perform a predetermined ink ejection operation so that the printing can be performed on the rear edge part of the recording sheet.

After the interlace process and the page end process are finished, the printer 3 drives the recording head 48 to print the image on the recording sheet (step S58). After the printing is finished (step S59: YES), the printer 3 deletes the data in the recording buffer (step S60), and sends print end information representing termination of the printing to the digital camera 2 (step S61). The print end information is transmitted to the digital camera in accordance with the predetermined protocol. If the number of copies is more than one, more than one copy is printed out by the printer 3.

After receiving the print end information from the printer 3, the digital camera 2 sends acknowledgment to the printer 3 to terminate the data communication with the printer 3. Then, the digital camera 2 returns to the standby state of allowing the user to select images and to make settings for printing, so that the user is able to select an image to be printed next and to input a print start command.

As described above, if displaying images on the LCD 10 of the printer 3 is not necessary, the image recording (printing) is performed by the printer 3 without storing image data and print setting information in the RAM 56 by simply setting the single print mode to the printer 3 as the print mode.

Figure 8:
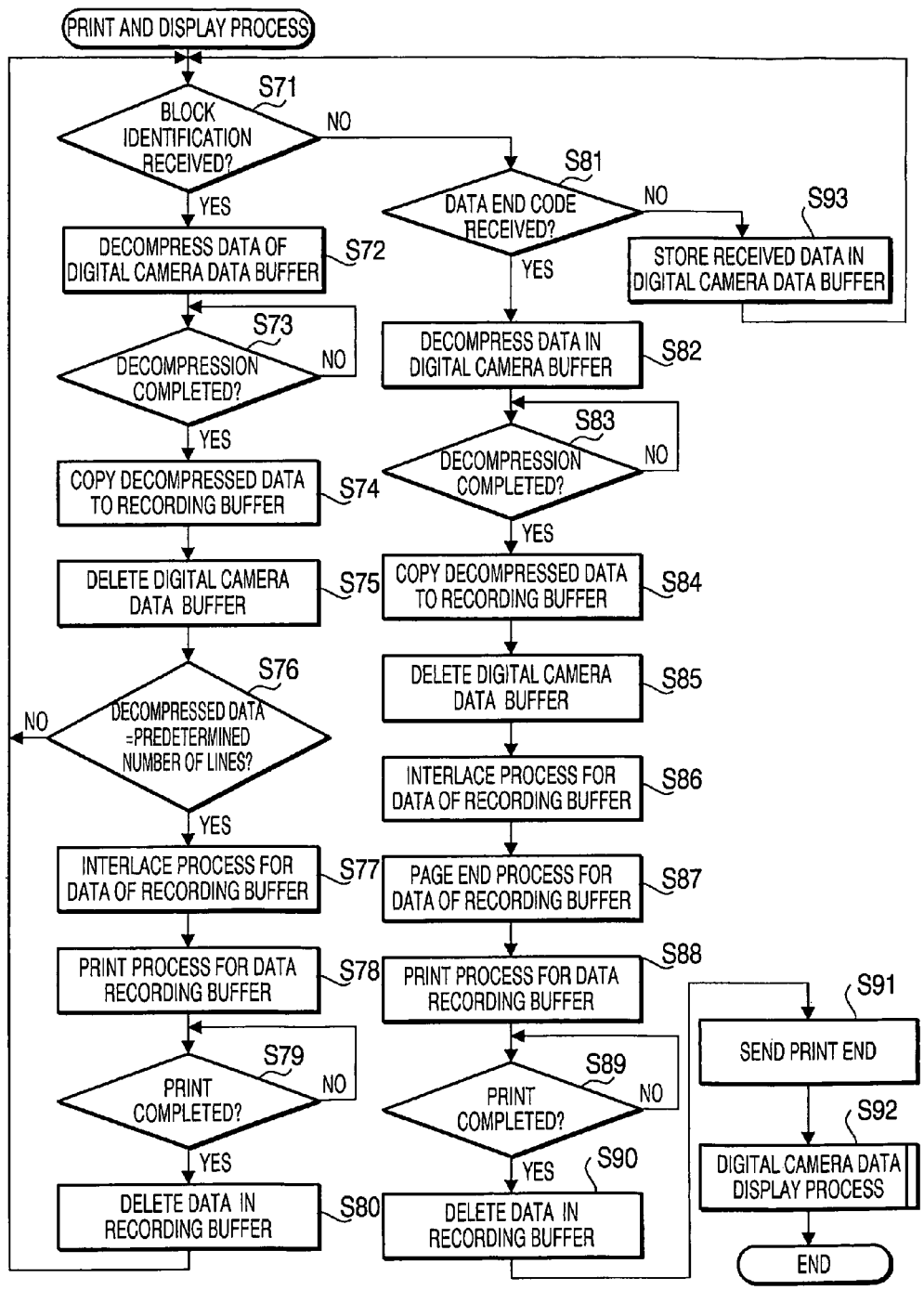
FIG. 8 is a flowchart illustrating a PRINT AND DISPLAY PROCESS executed by the printer shown in FIG. 4.

Hereafter, the print and display process executed under control of the CPU 54 of the printer 3 is explained in detail with reference to FIG. 8. The print and display process is executed in step S21 of the print process when the print and display mode is set to the printer 3. As described in detail below, in the print and display process, the image recording (printing) is performed in accordance with image data and print setting information from the digital camera 2, and thereafter the image data and the print setting information are stored in the RAM 56 and the image corresponding to the image data is displayed on the LCD 10.

First, the printer 3 judges whether a block identification contained in the image data from the digital camera 2 is received (step S71). If the block identification is not received (step S71: NO), control proceeds to step S81 where the printer 3 judges whether a data end code contained in the image data from the digital camera 2 is received. If the data end code is not received (S51: NO), the printer 3 stores the image data transmitted from the digital camera 2 in the digital camera data buffer assigned in the RAM 56 (step S93).

If the block identification is received (S71: YES), the printer 3 decompresses data which has been stored in the digital camera data buffer (step S72). When finishing the decompressing process (S73: YES), the printer 3 copies the decompressed data to the recording buffer to the recording buffer and the display buffer assigned in the RAM 56 (step S74). Then, the compressed image data stored in the digital camera buffer is deleted (step S75).

Next, the printer 3 judges whether the size of the decompressed data reaches a predetermined number of lines of movement of the recording head 48 (step S76). If the size of the decompressed data does not reach the predetermined number of lines (step S76: NO), control returns to step S71 to continue to received the image data from the digital camera 2. If the size of the decompressed data reaches the predetermined number of lines (step S76: YES), the printer 3 subjects the image data stored in the recording buffer to an interlace process so as to print an image corresponding to the data stored in the recording buffer using the recording head 48 (step S77). Then, the printer 3 prints out the image corresponding to the predetermined number of lines by driving the recording head 48 (step S78).

When the image printing corresponding to the predetermined number of lines is finished (step S79: YES), the printer 3 deletes the data in the recording buffer (step S80). Then, control returns to step S81 to continue to receive the image data from the digital camera 2. The above-mentioned operation in which the image recording is performed for each data unit corresponding to the predetermined number of lines is repeated until the data end code is received.

If the printer 3 receives the data end code (S81: YES), the printer 3 decompresses the image data stored in the digital camera data buffer (step S82). If the decompressing process is finished (S83: YES), the printer 3 copies the decompressed data to the recording buffer and the display buffer (step S84). Then, the printer 3 deletes the data in the digital camera data buffer (step S85).

Next, the printer 3 subjects the data in the recording buffer to the interlace process so as to print the image through use of the recording head 48 (step S86). Further, the printer 3 executes a page end process for the data (step S87). After the interlace process and the page end process are finished, the printer 3 drives the recording head 48 to print the image on the recording sheet (step S88). After the printing is finished (step S89: YES), the printer 3 deletes the data in the recording buffer (step S90), and sends print end information representing termination of the printing to the digital camera 2 (step S91).

After receiving the print end information from the printer 3, the digital camera 2 sends acknowledgment to the printer 3 to terminate the data communication with the printer 3. Then, the digital camera 2 returns to a standby state of allowing the user to select images and to make settings for printing, so that the user is able to select an image to be printed next and to input a print start command. Since the image data copied to the display buffer remains undeleted, the printer 3 performs a digital camera data display process using the image data stored in the display buffer (step S92).

Hereafter, the digital camera data display process is explained with reference to FIG. 9. As described above, in the print and display process, the printer 3 prints an image on a recording sheet in accordance with the image data and the print setting information transmitted from the digital camera 2, and thereafter sends print end information to the digital camera 2. Since the print end information was received, the digital camera 2 has returned to a standby state. Therefore, it is possible to conduct a user operation for selecting images on the digital camera 2 while the printer 3 executes the digital camera data display process. In other words, the printer 3 is not required to communicate with the digital camera 2 in the digital camera data display process.

Figure 9:
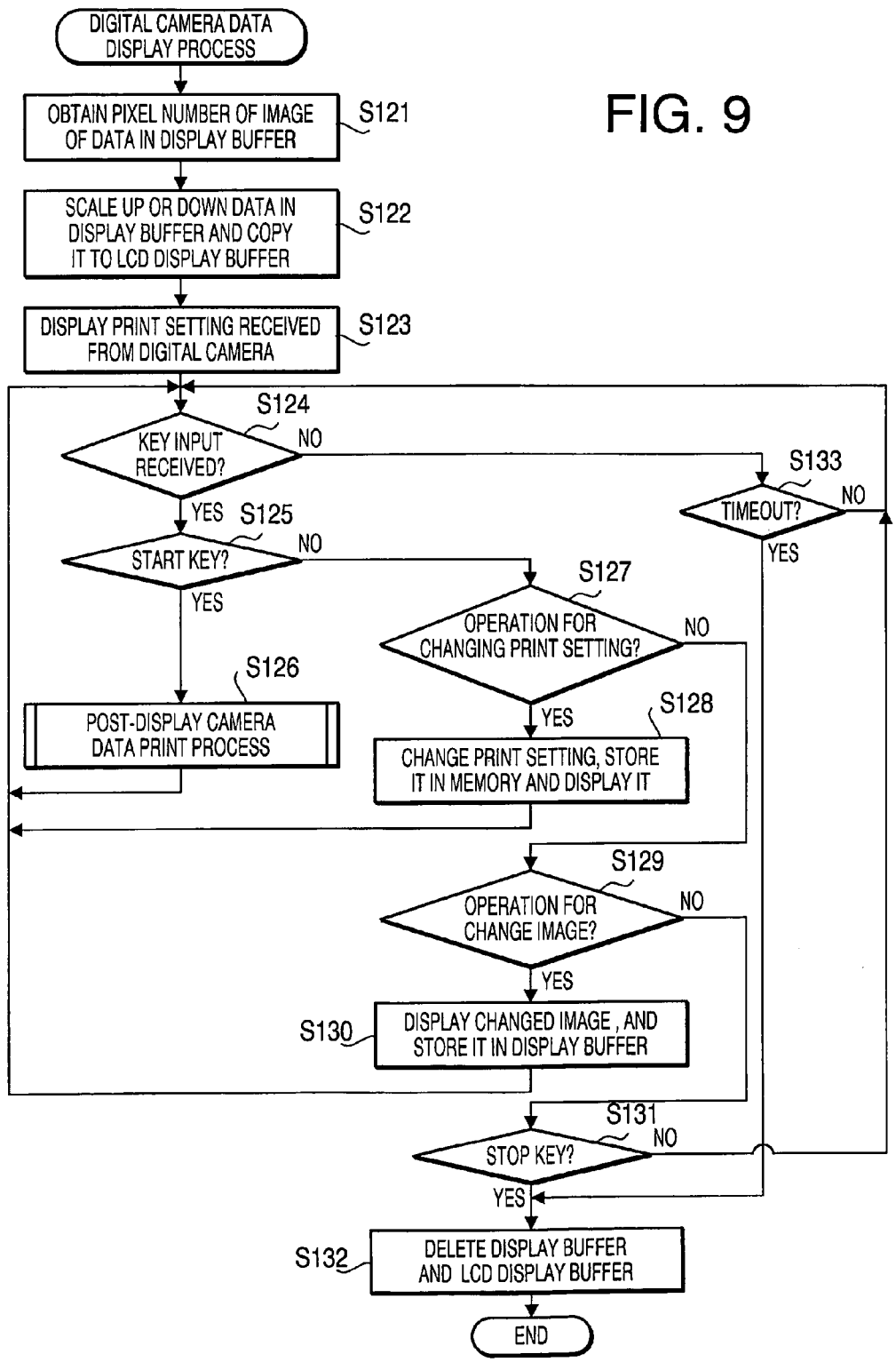
FIG. 9 is a flowchart illustrating a DIGITAL CAMERA DATA DISPLAY PROCESS executed by the printer shown in FIG. 4.

As shown in FIG. 9, first, the printer 3 obtains the pixel resolutions of vertical and horizontal directions of an image from the data stored in the display buffer (step S121). As described above, in the display buffer, the image data transmitted from the digital camera 2 is stored. The pixel resolutions that the image data in the display buffer are obtained in step S121. The printer 3 scales up or down the image corresponding to the image data in the display buffer, and copies it to the LCD display buffer assigned in the RAM 56 (step S122). There is a case where information concerning print settings is displayed on the LCD 10 of the printer 3 together with an image. Therefore, an image is displayed in a part of the LCD 10 (i.e., in an image display area of the LCD 10). In order to display the entire image corresponding to the image data stored in the display buffer, the printer 3 scales down the image data if the size (i.e., the number of pixels in the vertical and horizontal direction) of the image data is larger than the size (i.e., the number of pixels in the vertical and horizontal direction) of the image display area in the LCD 10 or scales up the image data if the size of the image data is smaller than the size of the image display area in the LCD 10.

In step S123, the image and print settings based on the image data and the print setting information, which are transmitted from the digital camera 2 and stored in the LCD display buffer, are displayed on the LCD 10. In this stage, the user is able to check the image and the print settings on the LCD 10 of the printer 3 after data communication between the digital camera 2 and the printer 3 is finished. In general, a printing device is able to employ an LCD having a larger size than that for a compact digital camera. That is, the printer 3 is able to employ the LCD 10 having the size the size larger than the size of the LCD 24 of the digital camera 2. Therefore, the user is able to check the details of the printed image viewing information and the image displayed on the LCD 10 having a relatively larger size.

After the image and the print settings are displayed on the LCD 10, the printer 3 waits for an input from the user for a certain time period (step S124). If an input is not received through the operation key 9 for a certain time period (S124: NO), the printer 3 judges that the timeout occurs (S133: YES). Then, the data stored in the display buffer and the LCD display buffer is deleted (step S132). In step S132, the image and information on the LCD 10 is also deleted.

After the image and the print settings are displayed on the LCD 10, the user is able to input commands for print start, change of print settings and change of image display. For example, the user is able to change the print settings or to execute image processing for the displayed image after checking the image already printed on a recording sheet and the same image displayed on the LCD 10. In other words, the user is able to print an image on a trial basis in advance, and thereafter the user is able to print an image on a sheet of a desired size and a desired type, to change brightness and contrast of the image or to subject the image to a trimming process.

In step S125, the printer 3 judges whether the input corresponds to the start key. If the input does not corresponds to the start key (S125: NO), control proceeds to step S127 where the printer 3 judge whether the input corresponds to an operation conducted through the operation key 9 for changing the print settings. If the print settings are newly inputted by the user through the operation key 9 (S127: YES), the printer 3 updates the print setting information stored in the RAM 56 and displays the changed print settings on the LCD 10 (step S128). By this configuration, the user is able to change the print settings (e.g., the size or type of a sheet, the rimless setting, or the number of copies) by checking the image displayed on the LCD 10 after the data communication between the digital camera 2 and the printer 3 is finished.

If the input does not correspond to the change of the print settings (S127: NO), control proceeds to step S129 where the printer 3 judges whether the input corresponds to an operation for adjustment of the image (i.e., image processing). If the input corresponds to the adjustment of the image (S129: YES), the printer 3 subjects the image to image processing in accordance with the input (step S130). For example, the image processing is adjustment of image quality (e.g., contrast setting), trimming, or unsharp masking. The image processing is executed by the CPU 54 using an image processing program stored in the RAM 55. In step S130, the printer 3 displays the image which has been subjected to the image processing, and store the image in the display buffer. By this configuration, the user is able to subject the image to desirable image processing by checking the image already printed on a sheet or the image displayed on the LCD 10 after the data communication between the digital camera 2 and the printer 3 is finished. Further, the user is able to check the image which has been subjected to the desirable image processing.

If the input does not correspond to the adjustment of the image (S129: NO), control proceeds to step S131 where the printer 3 judges whether the input corresponds to pressing of a stop key. If the input corresponds to the stop key (S131: YES), the printer 3 stops the change of the print setting and the image processing, and deletes the data stored in the display buffer and the, CD display buffer, and also deletes the image and information on the LCD 10 (step S132).

If it is judged in step S125 that the start key is pressed (S125: YES), the printer 3 executes a post-display digital camera data print process (step S126). By this configuration, the user is able to print out the image based on the changed print settings or the image to which the desirable image processing is applied.

Figure 10:
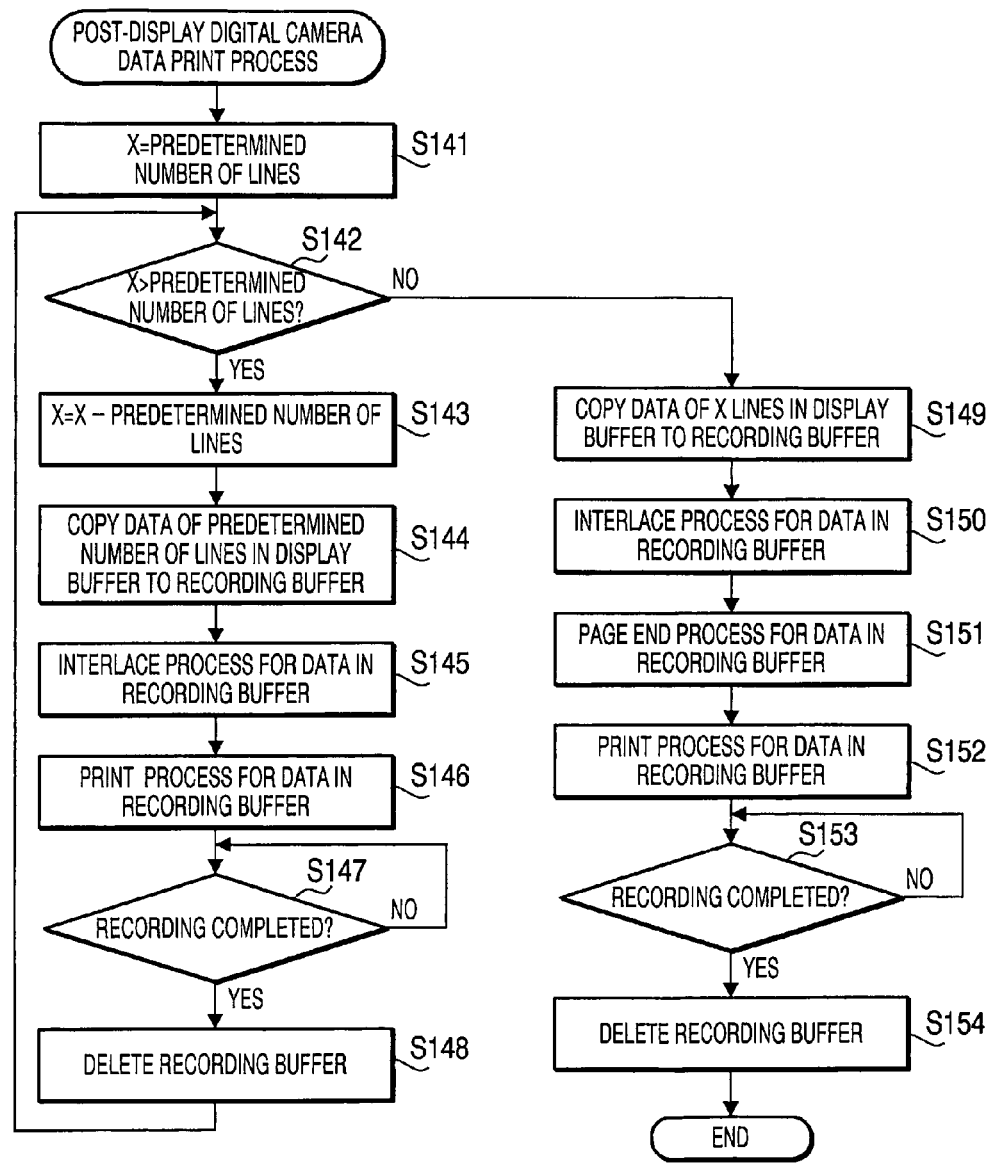
FIG. 10 is a flowchart illustrating a POST-DISPLAY DIGITAL CAMERA DATA PRINT PROCESS executed by the printer shown in FIG. 4.

FIG. 10 is a flowchart illustrating the post-display digital camera data print process. As shown in FIG. 10, first, the printer 3 assigns the number of lines of the image data stored in the display buffer to a variable X (step S141). Then, the printer 3 judges whether "X" is larger than a predetermined number of lines (step S142). If "X" is larger than a predetermined number of lines (S142: YES), the printer 3 subtracts the predetermined number of lines from "X" (step S143). Then, the printer 3 copies lines of image corresponding the predetermined number of lines to the recording buffer (step S144). As described above, the predetermined number of lines is determined based on a unit of data to be recorded in an interlace scan by the recording head 48 provided with nozzles arranged in a plurality of lines in the auxiliary scanning direction.

Next, the printer 3 executes an interlace process on the data stored in the recording buffer so as to print out an image through use of the recording head 48 (step S145). Then, the image corresponding to the predetermined number of lines is printed out while causing the recording head 48 to scan (step S146). In step S146, if the print settings have been changed, the sheet of the size and the type designated by the user is selected and used in accordance with the print setting information stored in the RAM 56.

Next, the printer 3 waits until the printing of the image corresponding to the predetermined number of lines is finished (S147: NO). If the printing of the image corresponding to the predetermined number of lines is finished (S147: YES), the printer 3 deletes the data stored in the recording buffer (step S148). Then, control returns to step S142 where the printer 3 further judges whether the number of lines of the image data stored in the display buffer (i.e., "X") is larger than the predetermined number of lines. If "X" is larger than the predetermined number of lines (S142: YES), the above-mentioned steps are repeated so that the printing of the image is executed for each image unit corresponding to the predetermined number of lines.

If it is judged in step S142 that "X" is smaller than or equal to the predetermined number of lines (S142: NO), the printer 3 copies the image corresponding to X lines to the recording buffer (step S149), and executes an interlace process on the image data stored in the recording buffer to print out the image data using the recording head 48 (step S150). Further, the printer 3 executes a page end process on the image data stored in the recording buffer (step S151).

Then, the printer 3 prints out the image while causing the recording head 48 to scan (step S152). Next, the printer 3 waits until the printing of the image is finished (S153: NO). if the printing of the image is finished (S153: YES), the printer 3 deletes the data stored in the recording buffer (step S154). By this configuration, the user is able to change the print settings or to execute the desirable image processing on the image data after the data communication between the digital camera 2 and the printer 3 is finished.

Hereafter, the single display process, which is executed under control of the CPU 54 of the printer 3 in step S32 of the print process when the single display process is designated as the print mode, is explained with reference to FIG. 11. In the single display process, the image data is displayed on the LCD 10 of the printer 3 without printing the image based on the image data and the print setting information from the digital camera 2.

Figure 11:
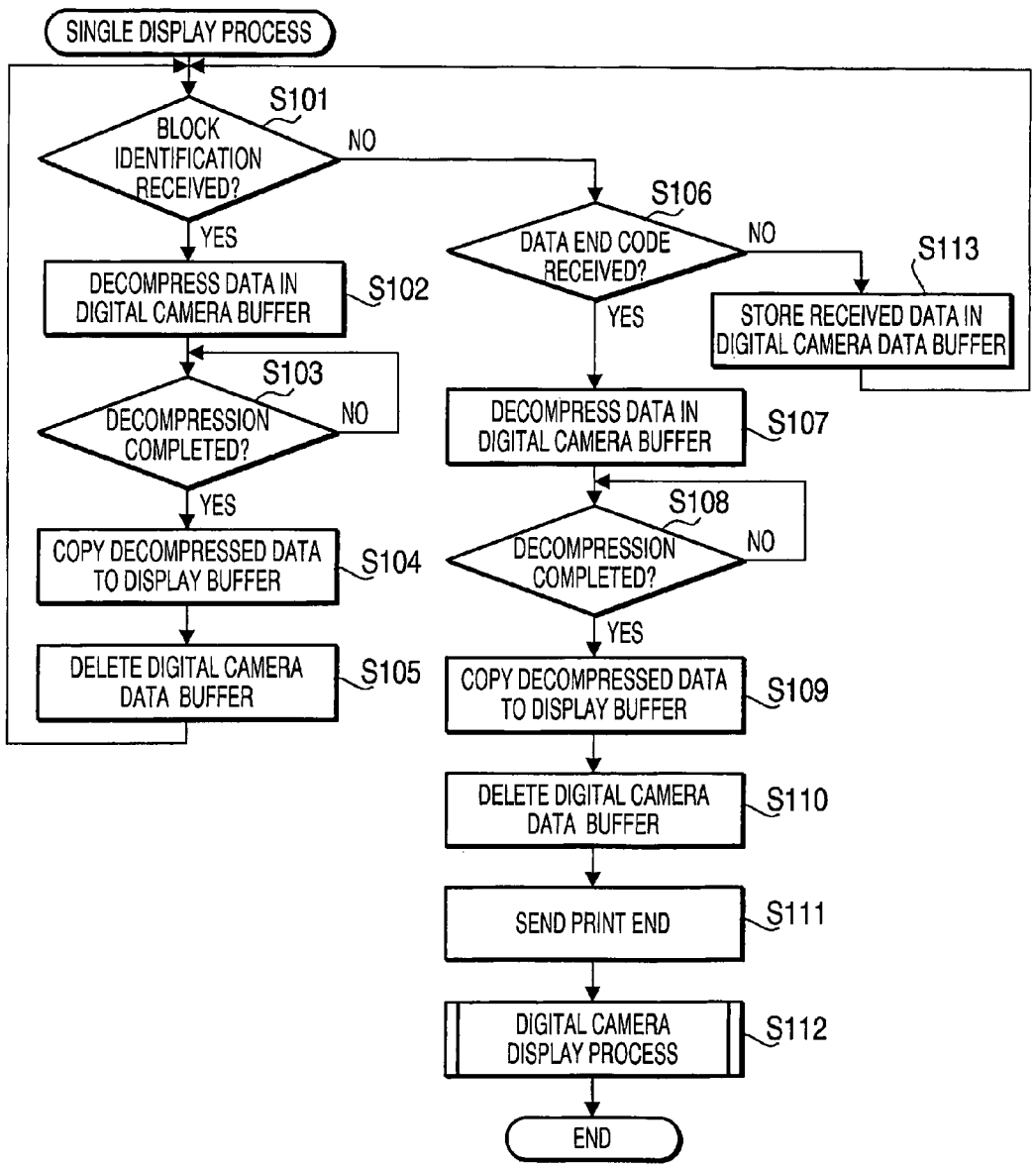
FIG. 11 is a flowchart illustrating a SINGLE DISPLAY PROCESS executed by the printer shown in FIG. 4.

As shown in FIG. 11, first, the printer 3 judges whether a block identification contained in the image data from the digital camera 2 is received (step S101). If the block identification is not received (step S101: NO), control proceeds to step S106 where the printer 3 judges whether a data end code contained in the image data from the digital camera 2 is received. If the data end code is not received (S106: NO), the printer 3 stores the image data transmitted from the digital camera 2 in the digital camera data buffer assigned in the RAM 56 (step S113).

If the block identification is received (S101: YES), the printer 3 decompresses data which has been stored in the digital camera data buffer (step S102). When finishing the decompressing process (S103: YES), the printer 3 copies the decompressed data to the recording buffer to the display buffer assigned in the RAM 56 (step S104). Then, the compressed image data stored in the digital camera buffer is deleted (step S105).

If the printer 3 receives the data end code (S106: YES), the printer 3 decompresses the image data stored in the digital camera data buffer (step S107). If the decompressing process is finished (S108: YES), the printer 3 copies the decompressed data to the display buffer (step S109). Then, the printer 3 deletes the data in the digital camera data buffer (step S110).

Next, the printer 3 sends print end information representing termination of the printing to the digital camera 2 (step S111). After receiving the print end information from the printer 3, the digital camera 2 sends acknowledgment to the printer 3 to terminate the data communication with the printer 3. Then, the digital camera 2 returns to a standby state of allowing the user to select images and to make settings for printing, so that the user is able to select an image to be printed next and to input a print start command. The printer 3 performs the digital camera data display process using the image data stored in the display buffer (step S112). The digital camera data display process executed in step S112 is the same as that shown in FIG. 9.

In the single display process, the printer 3 displays the image and print settings on the LCD 10 of the printer 3 based on the image data and the print setting information transmitted from the digital camera 2 and sends the print end information to the digital camera 2 without printing out the image in a sheet. After receiving the print end information, the digital camera 2 returns to the standby state as in the case of the single print mode or the print and display mode. Therefore, the user is able to select a desired image on the digital camera 2 when the printer 3 executes the digital camera data display process.

In the single display mode, the digital camera 2 is able to return to the standby state regardless of whether the printing of the image is performed on the printer 3. Even if the digital camera 2 is configured to perform data communication in accordance with a certain general-purpose communication protocol for direct printing, the printer 3 is able to normally terminate the data communication with the digital camera 2 in accordance with the certain general-purpose communication protocol without recording (i.e., printing) the image on a sheet. In other words, the printer 3 is able to perform data communication with the digital camera 2 in accordance with a standard communication protocol in the single display mode. Such a configuration of the printer 3 enhances the usability of the printer 3 because the printer 3 is able to support various types of external devices adopting a standard communication protocol.

As explained with reference to FIG. 9, the image data and the print setting information transmitted from the digital camera 2 is stored in the RAM 56, and the image and print settings based on the image data are displayed on the LCD 10 of the printer 3. Therefore, the user is able to check the image and print settings on the LCD 10 of the printer 3 after data communication between the digital camera 2 and the printer 3 is finished. Further, the user is able to change the print settings, execute desirable image processing or execute printing of the image again based on the image data and the print setting information stored in the RAM 56 of the printer 3 after checking the image and the print settings displayed on the LCD 10 of the printer 3.

Although the present invention has been described in considerable detail with reference to certain preferred embodiments thereof, other embodiments are possible.

In the above-mentioned embodiment, the printer 3 is configured such that one of the single print mode, the print and display mode and the single display mode is selectable, the present invention is not limited to such a configuration.

In the above-mentioned embodiment, the digital camera 2 is used as an external device to be connected to the printer 3. Various types of devices, such as a digital video camera or a multifunction device having a digital camera function, may be used in the image forming system in place of the digital camera 2.

What is claimed is:

1. A priming device, comprising:
    a printing unit configured to print an image on a recording sheet;
    a communication unit configured to receive, from an external device, image data and a print execution instruction for executing a printing by the printing unit based on the image data; a display unit; a storage unit; and a controller configured to operate, in a display mode, to store the received image data in the storage unit, display an image;
    corresponding to the received image data on the display unit, transmit, without printing of the received image data on the recording sheet, print end information to the external device representative of completion of printing of the received image data without and terminate communication for printing with the external device;
    wherein the controller operates to:
    judge whether the storage unit has storing area for storing the image data from the external device before storing the image data; and
    transmit a notification indicating that printing is inexecutable to the external device through the communication unit if it is judged that the storage unit does not have the free space for storing the image data and the print setting information.

2. The printing device according to claim 1, wherein the controller causes the printing unit to print an image on the recording medium in accordance with the image data stored in the storage unit.

3. The printing device according to claim 1, further comprising an input unit, wherein the controller further causes the printing unit to print an image in accordance with the image data stored in the storage unit in response to a print start command inputted through the input unit.

4. The printing device according to claim 3, wherein the controller stores print setting information in the storage unit based on the print setting information inputted through the input unit.

5. The printing device according to claim 4, wherein the controller executes image processing on the image data stored in the storage unit, displays an image corresponding to the processed image data, and stores the processed image data in the storage unit in response to a command for image processing inputted through the input unit.

6. An image forming system in which a printing device is connected to an external device, wherein the external device comprises:
    a capture unit configured to capture an image;
    a media controller configured to store the captured image in memory;
    an inputting unit configured to input a print request of the captured image;
    a first communication unit configured to communicate with the external device; and
    a first controller configured to transmit a print request of the captured image and to transmit the captured image to a connected printer,
    wherein the printing device comprises: a printing unit configured to print an image on a recording medium; a second communication unit configured to receive, from the external device, image data and a print execution instruction for executing a printing by the printing unit based on the image data;
    a display unit on which an image is displayed;
    a storage unit; and
    a controller configured to operate, in a display mode, to store the received image data in the storage unit, display an image corresponding to the received image data on the display unit, transmit, without printing of the received image data on the recording sheet, print end information to the external device representative of completion of printing of the received image data and terminate communication for printing with the external device,
    wherein, in the single display mode, the controller of the recording device operates to:
    judge whether the storage unit has storing area for storing the image data from the external device before storing the image data; and
    transmit a notification indicating that printing is inexecutable to the external device through the communication unit if it is judged that the storage unit does not have the free space for storing the image data and the print setting information, and wherein the external device moves to a standby mode after receiving the notification indicating that printing is inexecutable.

7. The image forming system according to claim 6, wherein the controller of the printing device causes the printing unit to print an image on the recording medium in accordance with the image data stored in the storage unit.

8. The image forming system according to claim 6, wherein the printing device further comprises an input unit, wherein the controller of the printing device further causes the printing unit to print an image in accordance with the image data stored in the storage unit in response to a print start command inputted through the input unit.

9. The image forming system according to claim 8, wherein the controller stores print setting information in the storage unit based on the print setting information inputted through the input unit.

10. The image forming system according to claim 9, wherein the controller of the recording device executes image processing on the image data stored in the storage unit, displays an image corresponding to the processed image data, and stores the processed image data in the storage unit in response to a command for image processing inputted through the input unit.

11. A method of forming an image in a system in which a recording device is connected to an external device, comprising the steps of:
storing image data and print setting information transmitted from the external device in a storage medium of the recording device;
displaying an image corresponding to the image data stored in the storage medium on a display of the recording device;
transmitting, without printing of the received image data on the recording sheet, print end information from the recording device to the external device representative of completion of printing of the received image data in accordance with a predetermined communication protocol and
terminating communication for printing between the recording device and the external device after transmitting the information representative of completion of printing:
judging, on the recording device, whether the storage medium has free space for storing the image data and the print setting information transmitted from the external device before storing the image data and the print setting information in the storage medium;
transmitting a notification indicating that printing is in inexecutable from the recording device to the external device if it is judged that the storage medium does not have the free space for storing the image data and the print setting information;
and moving the external device, which received the notification, to a standby state.

12. The method according to claim 11, further comprising the step of:
recording an image, on the recording device, in accordance with the image data and the print setting information stored in the storage medium in response to a print start command inputted to the recording device.

13. The method according to claim 11, further comprising the step of:
updating the print setting information in the storage medium in accordance with print settings inputted to the recording device.

14. The method according to claim 11, further comprising the steps of:
executing, on the recording device, image processing for the image data stored in the storage medium; and displaying an image corresponding to the image data processed by the image processing on the display of the recording device.

15. A computer usable storage device having computer readable instructions stored thereon, which, when executed by a computer connected to an external device, are configured to:
record an image on a recording device in accordance with image data and print setting information transmitted from the external device;
store the image data and the print setting information in a storage medium; display an image corresponding to the image data stored in the storage medium on a display, in response to receipt of print execution instruction sent from the external device with the image data;
transmit without printing of the received image data on the recording sheet print end information to the external device representative of completion of printing of the received image data in accordance with a predetermined communication protocol and terminate communication for printing between the recording device and the external device:
judging, on the recording device, whether the storage medium has free space for storing the image data and the print setting information transmitted from the external device before storing the image data and the print setting information in the storage medium;
transmitting a notification indicating that printing is in inexecutable from the recording device to the external device if it is judged that the storage medium does not have the free space for storing the image data and the print setting information;
and moving the external device, which received the notification, to a standby state.

16. A computer usable storage device having computer readable instructions stored thereon, which, when executed by a computer connected to an external device, are configured to:
store image data and print setting information transmitted from the external device in a storage medium;
display an image corresponding to the image data stored in the storage medium on a display;
transmit without printing of the received image data on the recording sheet print end information to the external device representative of completion of printing of the received image data in accordance with a predetermined communication protocol without and terminate communication for printing between the computer and the external device:
judging, on the recording device, whether the storage medium has free space for storing the image data and the print setting information transmitted from the external device before storing the image data and the print setting information in the storage medium;
transmitting a notification indicating that printing is in inexecutable from the recording device to the external device if it is judged that the storage medium does not have the free space for storing the image data and the print setting information;
and moving the external device, which received the notification, to a standby state.

17. A method of forming an image in a system in which a recording device is connected to an external device, comprising the steps of: storing image data and print setting information transmitted from the external device in a storage medium of the recording device; displaying an image corresponding to the image data stored in the storage medium on a display of the recording device;

transmitting without printing of the received image data on the recording sheet, print end information from the recording device to the external device representative of completion of printing of the received image data in accordance with a predetermined communication protocol and terminating communication for printing between the recording device and the external device:

judging, on the recording device, whether the storage medium has free space for storing the image data and the print setting information transmitted from the external device before storing the image data and the print setting information in the storage medium;

transmitting a notification indicating that printing is inexecutable from the recording device to the external device if it is judged that the storage medium does not have the free space for storing the image data and the print setting information;

and moving the external device, which received the notification, to a standby state.

* * * * *